(12) United States Patent
Hytken

(10) Patent No.: US 11,162,343 B2
(45) Date of Patent: *Nov. 2, 2021

(54) THERMAL ENERGY DELIVERY AND OIL PRODUCTION ARRANGEMENTS AND METHODS THEREOF

(71) Applicant: Future Energy, LLC, Dayton, OH (US)

(72) Inventor: Kent B. Hytken, San Diego, CA (US)

(73) Assignee: Future Energy, LLC, Dayton, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/843,188

(22) Filed: Apr. 8, 2020

(65) Prior Publication Data

US 2020/0232308 A1 Jul. 23, 2020

Related U.S. Application Data

(63) Continuation of application No. 15/126,716, filed as application No. PCT/US2015/023773 on Apr. 1, 2015, now Pat. No. 10,669,828.

(Continued)

(51) Int. Cl.
  *E21B 43/24* (2006.01)
  *E21B 36/00* (2006.01)
  *E21B 33/12* (2006.01)

(52) U.S. Cl.
  CPC ............ *E21B 43/24* (2013.01); *E21B 36/005* (2013.01); *E21B 43/2406* (2013.01); *E21B 33/12* (2013.01)

(58) Field of Classification Search
  CPC ......... E21B 17/18; E21B 43/24; E21B 36/005
  See application file for complete search history.

(56) References Cited

U.S. PATENT DOCUMENTS

| | | |
|---|---|---|
| 3,323,590 A | 6/1967 | Gilcrist |
| 4,008,765 A | 2/1977 | Anderson et al. |

(Continued)

FOREIGN PATENT DOCUMENTS

| | | | |
|---|---|---|---|
| WO | 2012024541 A1 | 2/2012 | |
| WO | WO-2012024541 A1 * | 2/2012 | ............ E21B 43/24 |
| WO | 2013142242 A1 | 9/2013 | |

OTHER PUBLICATIONS

"Equalizer RF Flow Control Device, Install flow control technology post-completion to maximize ultimate recovery"; Baker Hughes, bakerhughes.com, Overview; pp. 1-2.

(Continued)

*Primary Examiner* — Robert E Fuller
*Assistant Examiner* — Lamia Quaim
(74) *Attorney, Agent, or Firm* — Dinsmore & Shohl, LLP

(57) ABSTRACT

Thermal energy delivery and oil production arrangements and methods thereof are disclosed which heat a subterranean formation, and which comprises positioning concentric tubing strings in a wellbore; heating a heat transfer fluid using a surface thermal fluid heater; flowing a liquid or feedwater downward through an extremely hot innermost tubing string that is inside and concentric to an outermost tubing string and a casing/annulus, which extends below a thermal packer positioned in the wellbore, and continually circulating the heat transfer fluid through the outermost tubing string and the casing/annulus above the thermal packer such that the liquid or feedwater flowing through the innermost tubing string is heated thereby and injected into the wellbore below the thermal packer and out of perforations to heat the subterranean formation to temperatures that allow for hydrocarbon production from the subterranean formation. Emissions may be injected into the subterranean formation with the liquid or feedwater.

14 Claims, 12 Drawing Sheets

Related U.S. Application Data

(60) Provisional application No. 61/973,598, filed on Apr. 1, 2014.

(56) References Cited

U.S. PATENT DOCUMENTS

| | | | |
|---|---|---|---|
| 4,250,963 | A | 2/1981 | Hess |
| 4,265,310 | A | 5/1981 | Britton |
| 4,385,664 | A | 5/1983 | Hutchison |
| 4,641,710 | A | 2/1987 | Klinger |
| 5,366,012 | A | 11/1994 | Lohbeck |
| 5,816,325 | A | 10/1998 | Hytken |
| 6,354,373 | B1 | 3/2002 | Vercaemer et al. |
| 7,367,399 | B2 | 5/2008 | Steele et al. |
| 7,814,981 | B2 | 10/2010 | Marcu |
| 7,832,482 | B2 | 11/2010 | Cavender et al. |
| 2013/0312959 | A1 | 11/2013 | Hytken |

OTHER PUBLICATIONS

Cuiyu et al., "Study on Steam Huff and Puff Injection Parameters of Herringbone Well in Shallow and Thin Heavy Oil Reservoir", The Open Petroleum Engineering Journal, 2013, 6, pp. 69-75; 1874-834/13 2013 Bentham Open.

\* cited by examiner

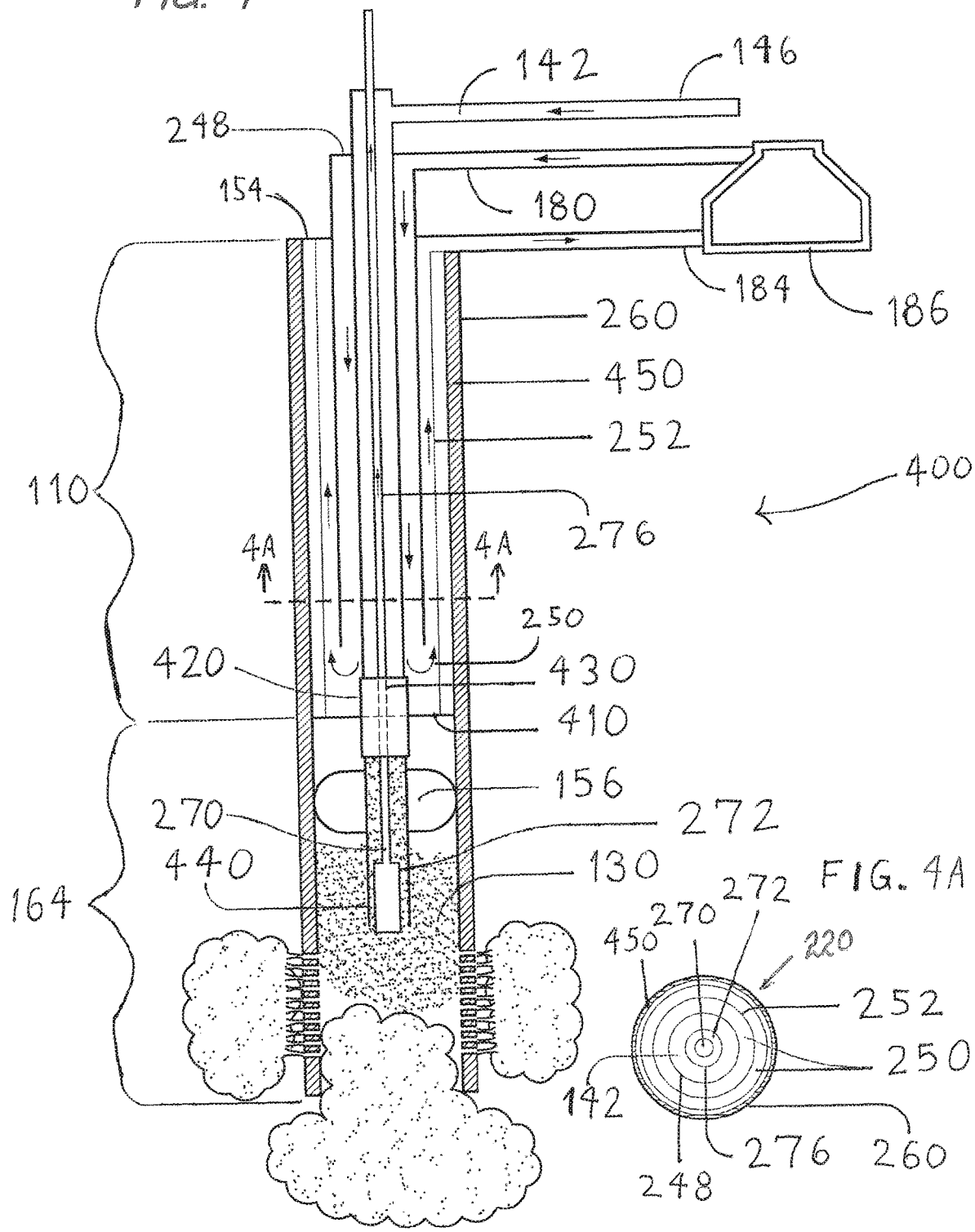

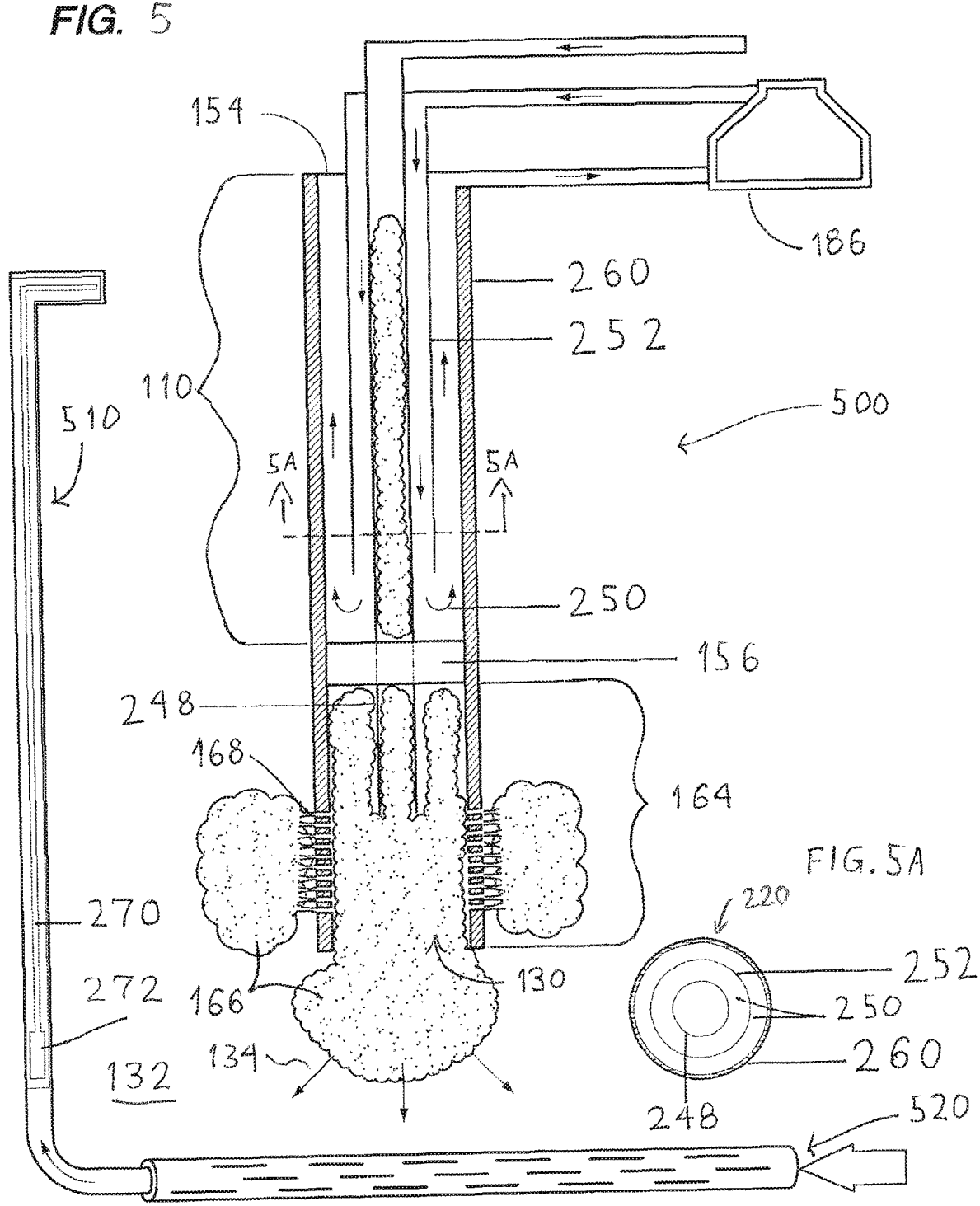

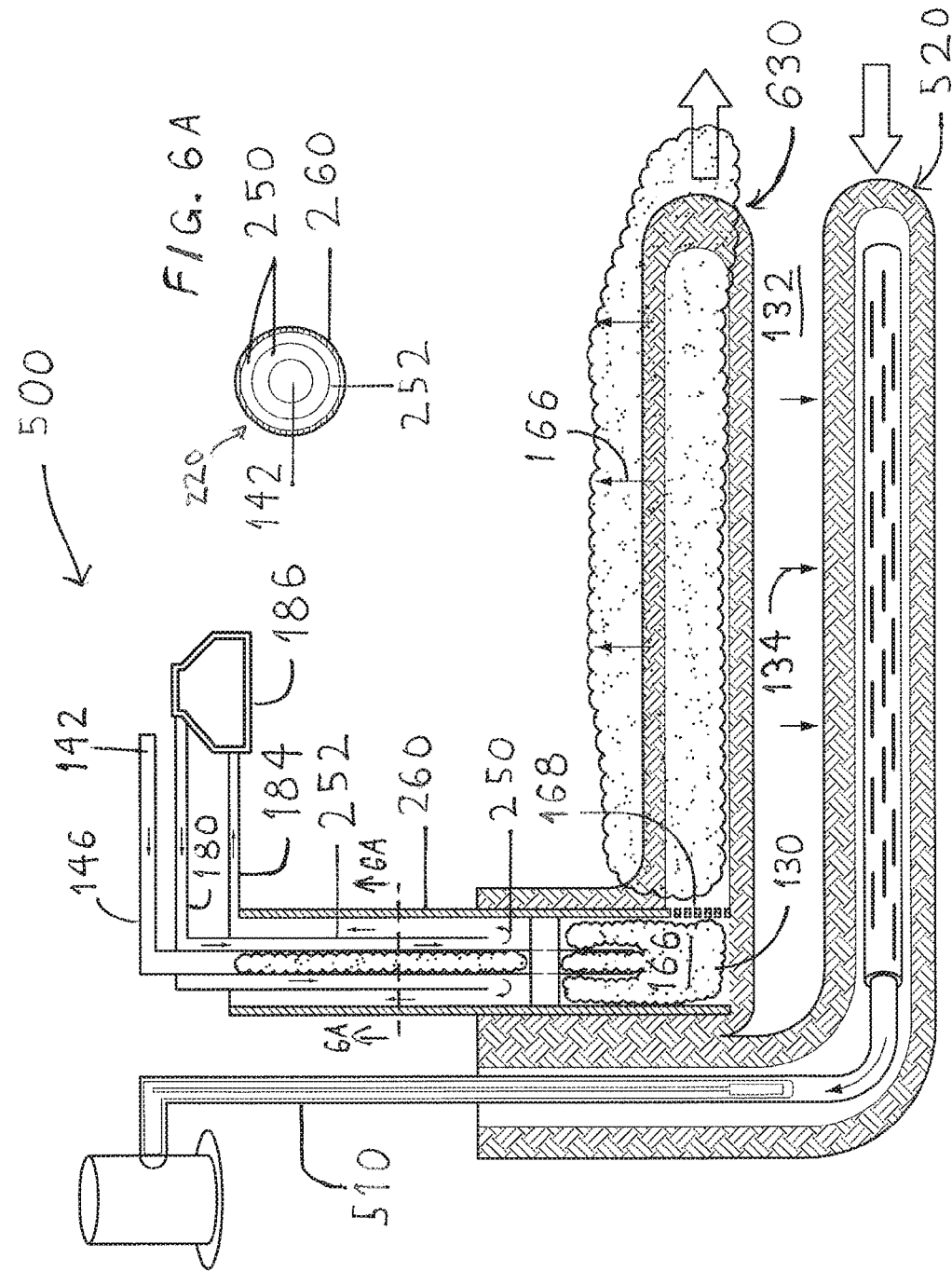

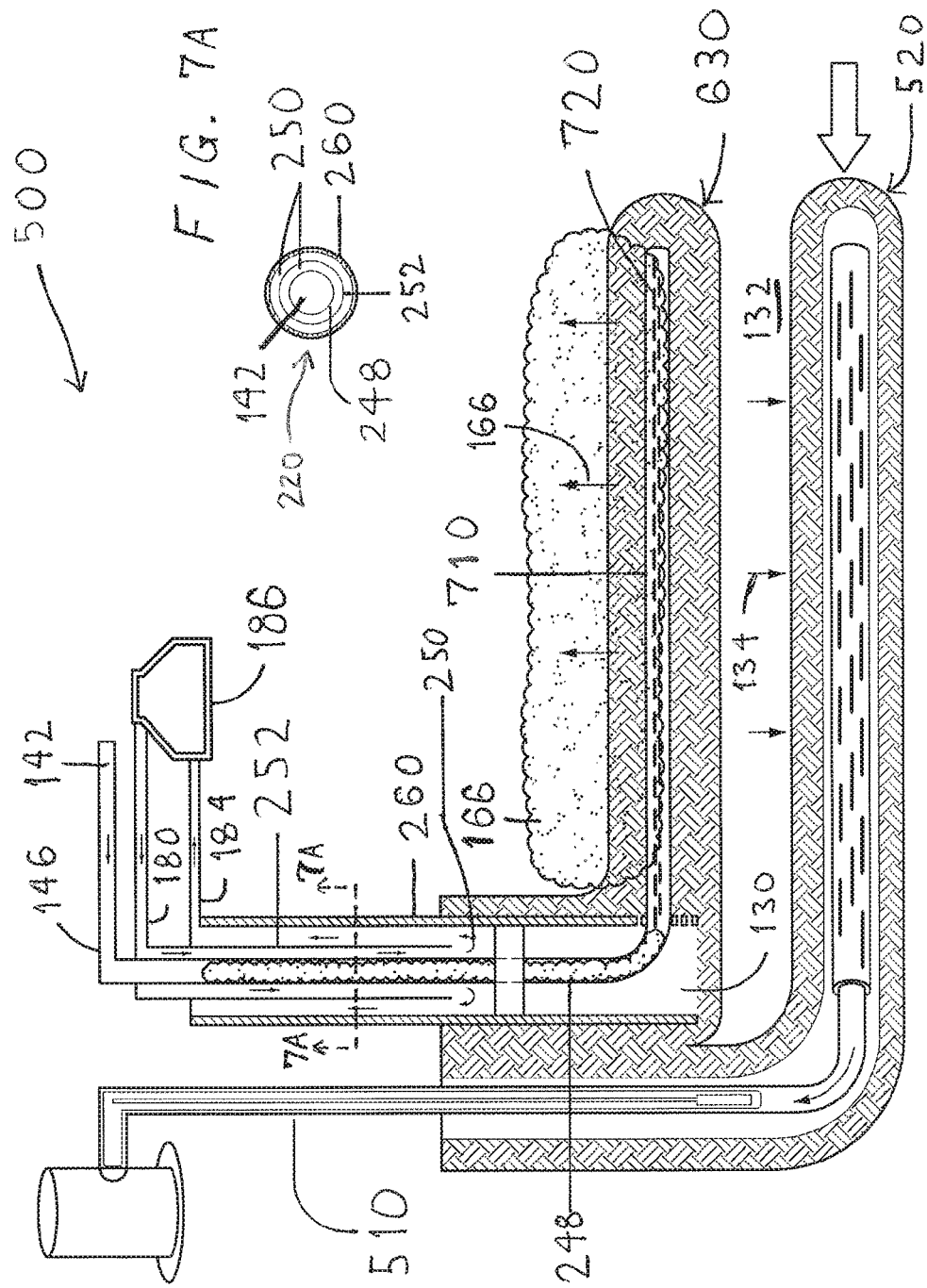

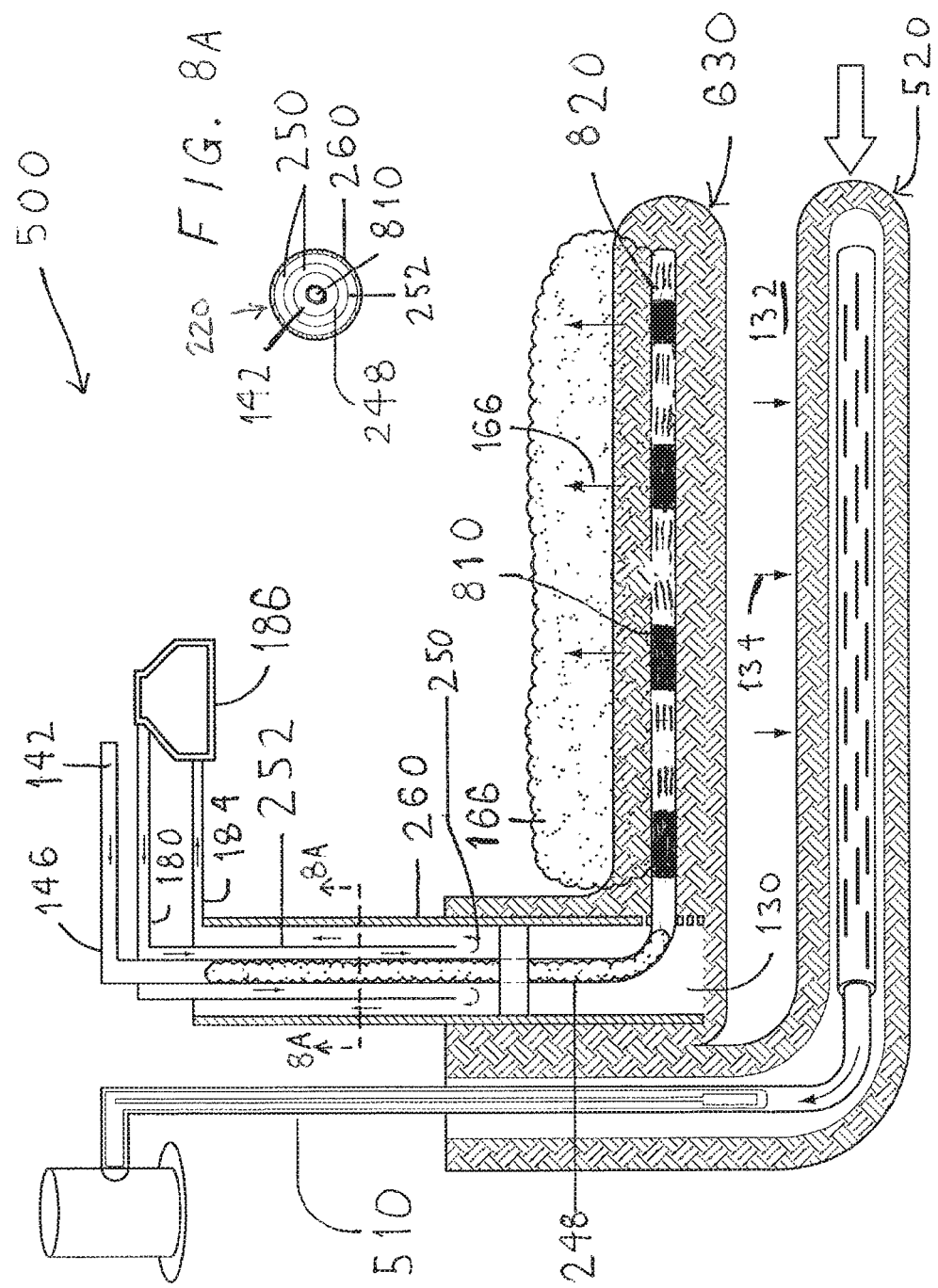

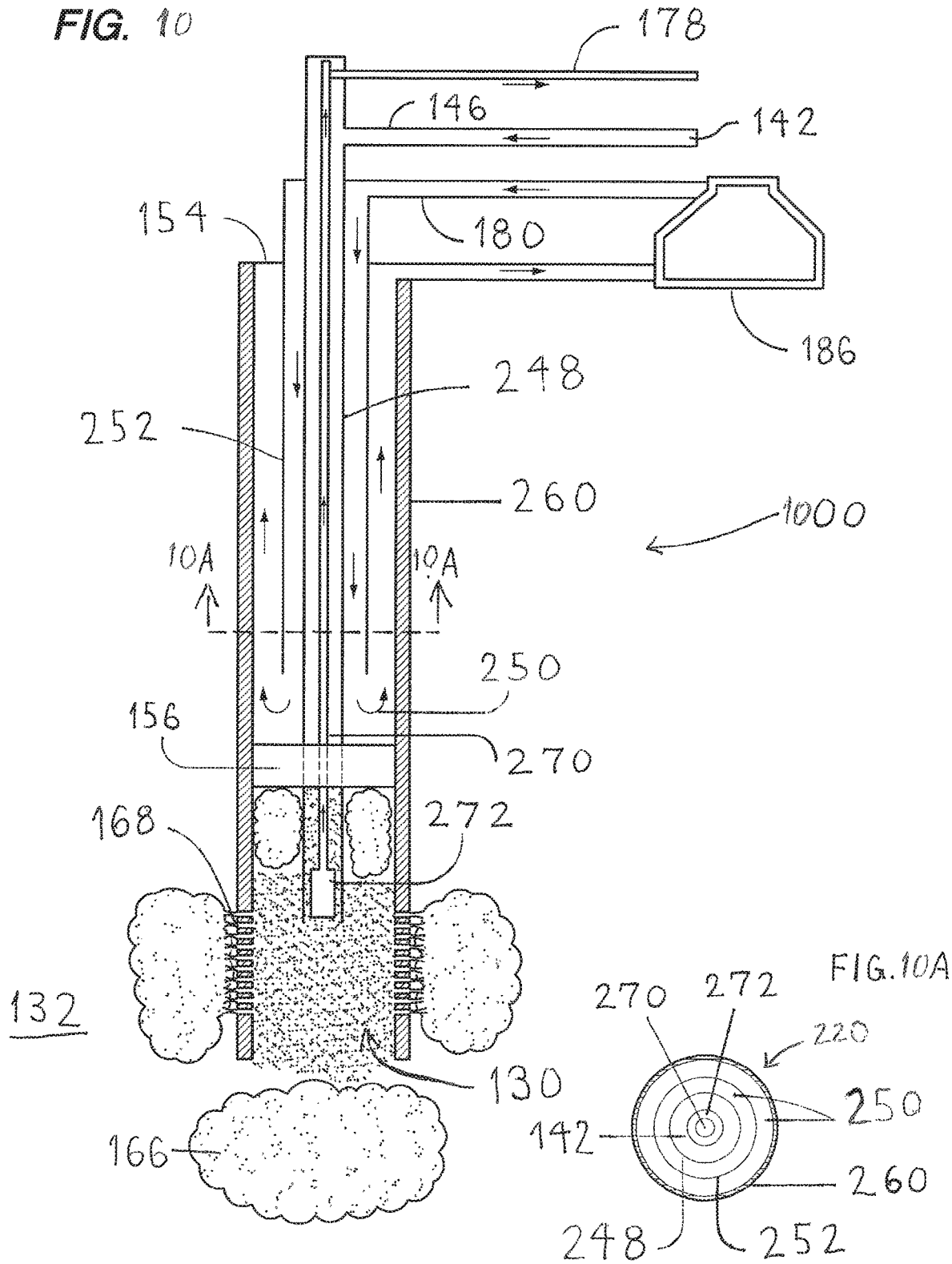

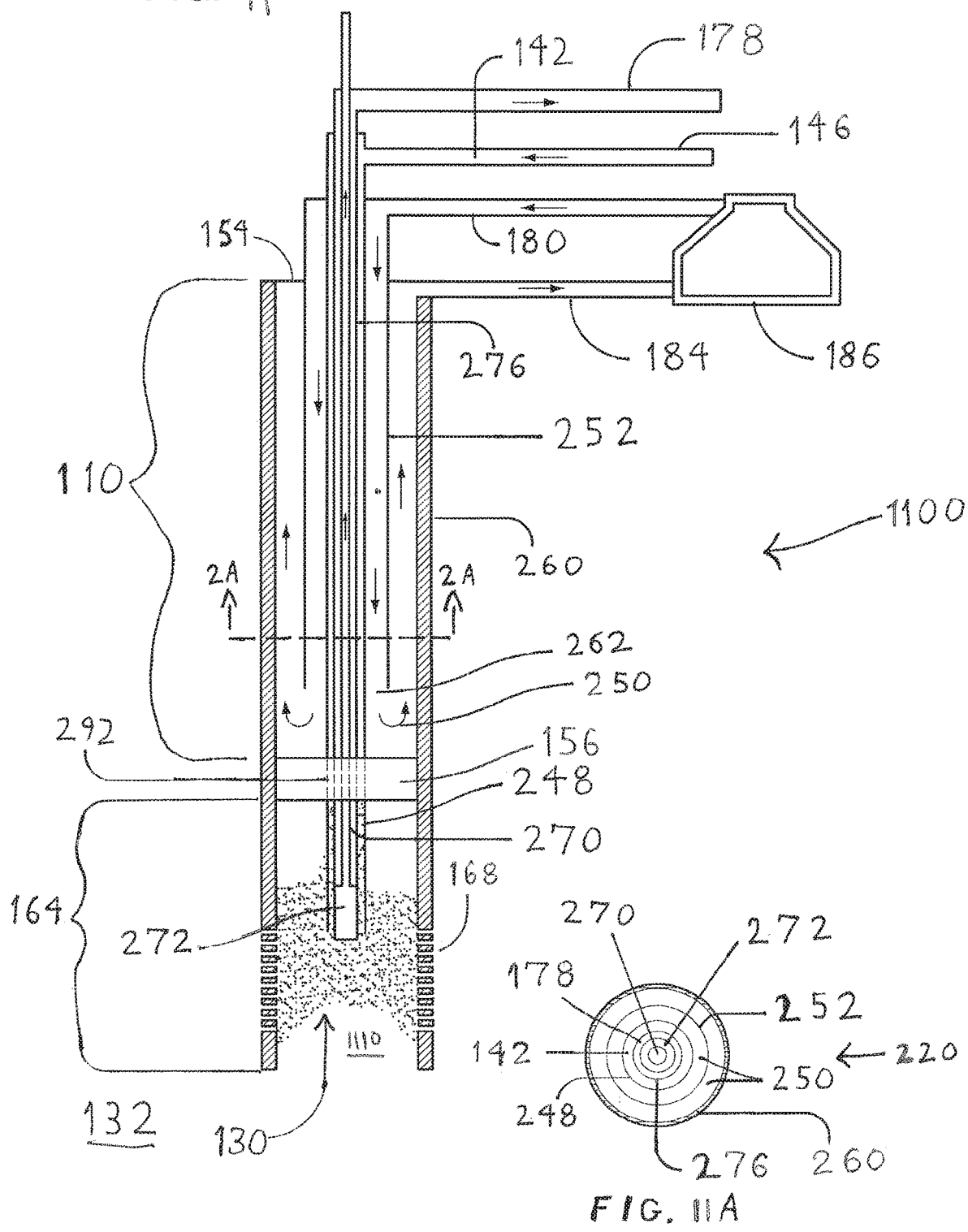

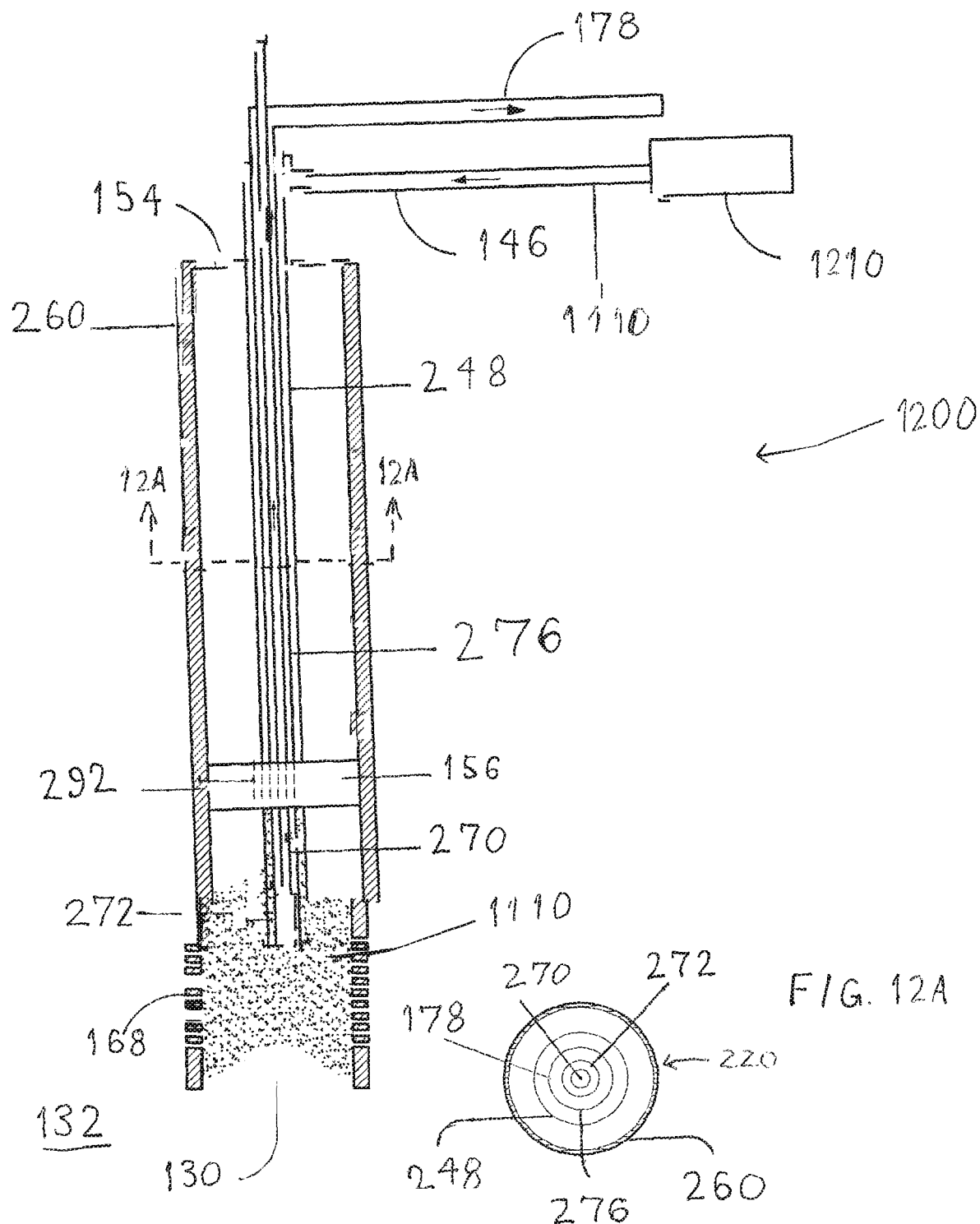

THERMAL ENERGY DELIVERY AND OIL PRODUCTION ARRANGEMENTS AND METHODS THEREOF

CROSS-REFERENCE TO RELATED APPLICATIONS

This application is a continuation of U.S. patent application Ser. No. 15/126,716, filed Sep. 16, 2016, which is a is a national stage application, filed under 35 U.S.C. § 371, of International Patent Application No. PCT/US2015/023773, filed on Apr. 1, 2015, which claims the benefit of U.S. Provisional Patent Application No. 61/973,598, filed Apr. 1, 2014, each of which is incorporated by reference herein in its entirety.

TECHNICAL FIELD

The present disclosure relates generally to methods and systems for production of hydrocarbons from various subterranean formations through the use of downhole thermal energy delivery and oil production arrangements and methods thereof.

BACKGROUND

Steam injection is used to lower the viscosity of heavy oil and oil sands trapped in the underground rock formations, such that it flows through the reservoir and can be recovered by conventional methods. Additionally, steam injection is used in light oil formations to increase recovery of residual oil after depletion of reservoir pressure. Pressurized steam can add new pressure to the light oil subterranean deposit, in that as the injection steam condenses to water, the water will act as a drive mechanism to push the oil through the reservoir to the production wells. Studies have shown that steam distillation improves light oil recovery from thin reservoirs. Steam distillation means that steam injection will cause some volatile components of the crude to enter a vapor phase. Moreover, steam injection can be used in the production of methane hydrate and the remediation of groundwater contamination.

SUMMARY

Various embodiments of the present invention provide for improved delivery of downhole thermal energy, or heat and high-pressure, high-quality downhole steam, to increase the efficiency of recovery of hydrocarbons from a subterranean formation.

In some embodiments, an in situ heat treatment system for producing hydrocarbons from a subterranean formation that includes a wellbore in the subterranean formation is disclosed. Concentric tubing strings are positioned in the wellbore along with a thermal packer that is also positioned in the wellbore. A non-toxic hot heat transfer fluid closed loop circulation system is coupled to the outermost tubing string, and the casing/annulus for a relatively cooled, hot heat transfer fluid to return to the surface to be reheated in the thermal fluid heater and recirculate down hole. A liquid supply, hot feedwater, is configured to provide through a hot permanent innermost tubing string of the concentric tubing strings that is inside and concentric to the outermost tubing string. A thermal fluid heater is configured on the surface to heat the non-toxic hot heat transfer fluid continually circulated through the outermost tubing string above the thermal packer positioned in the wellbore to immediately convert the liquid, which descends in the innermost tubing string, into high-pressure, high-quality downhole steam, wherein the permanent innermost tubing string extends below the surface such that the liquid immediately converts to high-pressure, high-quality downhole steam inside the innermost hot tubing string that minimizes or eliminates heat loss and is injected into the steam injection wellbore below the thermal packer to heat the subterranean formation to temperatures that allow for viscous hydrocarbon production from the subterranean formation.

In some embodiments, a method of heating a subterranean formation is disclosed. The method includes positioning concentric tubing strings in a wellbore; heating a non-toxic hot heat transfer fluid using a surface thermal fluid heater; and flowing a liquid downward through a hot innermost tubing string of the concentric tubing strings that is inside and concentric to the outermost tubing string, which does not convert to a vapor phase for a time period and extends below a thermal packer positioned in the wellbore to achieve a hot fluid injection in the subterranean formation. The method also may include continually circulating the non-toxic hot heat transfer fluid through the outermost tubing string above the thermal packer such that the liquid flowing through the hot innermost tubing string after the time period is converted into high-pressure, high-quality downhole steam, which is injected into the wellbore below the thermal packer and out of the perforations to heat the subterranean formation to temperatures that allow for hydrocarbon production from the subterranean formation.

In some embodiments, a method of heating a subterranean formation is disclosed. The method includes positioning concentric tubing strings in a wellbore; heating a non-toxic hot heat transfer fluid using a surface thermal fluid heater; and flowing a liquid downward through a hot innermost tubing string of the concentric tubing strings that is inside and concentric to the outermost tubing string, which does not convert to a vapor phase for a time period and extends below a thermal packer positioned in the wellbore to achieve a hot fluid injection in the subterranean formation. The method also may include continually circulating the hot heat transfer fluid through the outermost tubing string above the thermal packer such that the liquid flowing through the very hot innermost tubing string after the time period is converted into high-pressure, high-quality downhole steam, which is injected into the wellbore below the thermal packer and out of the perforations to heat the subterranean formation to temperatures that allow for recovery of volatile and semi-volatile organic contaminants from the subterranean formation or degradation by natural attenuation processes.

These and other features and advantages of this invention will become more apparent to those skilled in the art from the detailed description of various embodiment discussed below.

BRIEF DESCRIPTION OF THE DRAWINGS

The drawings that accompany the detailed description are described below, wherein like numerals refer to like parts, elements, components, etc., and in which:

FIG. 2A is a cross-section view of concentric tubing strings provided in the arrangement of FIG. 2 and taken along section line 2A-2A;

FIG. 4 is a schematic illustration of a vertical wellbore with a high-quality downhole steam generation and oil production arrangement for non-thermally completed wells in accordance with still another embodiment;

FIG. 4A is a cross-section view of concentric tubing strings provided in the arrangement of FIG. 4 and taken along section line 4A-4A;

FIG. 5 is a schematic illustration of a vertical wellbore with a high-quality downhole steam generation and oil production arrangement known as steam drive or steam flooding in accordance with yet another embodiment;

FIG. 5A is a cross-section view of concentric tubing strings provided in the arrangement of FIG. 5 and taken along section line 5A-5A;

FIG. 6 is a schematic illustration of the embodiment of FIG. 5 configured for steam assisted gravity drainage (SAGD);

FIG. 6A is a cross-section view of concentric tubing strings provided in the arrangement of FIG. 6 and taken along section line 6A-6A;

FIG. 7 is a schematic illustration of the embodiment of FIG. 5 configured for steam assisted gravity drainage (SAGD) with a perforated pipe or slotted liner;

FIG. 7A is a cross-section view of concentric tubing strings provided in the arrangement of FIG. 7 and taken along section line 7A-7A;

FIG. 8 is a schematic illustration of the embodiment of FIG. 5 configured for steam assisted gravity drainage (SAGD) with steam chambers;

FIG. 8A is a cross-section view of concentric tubing strings provided in the arrangement of FIG. 8 and taken along section line 8A-8A;

FIG. 10 is a schematic illustration of a vertical wellbore with a high-quality downhole steam generation and oil production arrangement known as cyclic steam stimulation or huff-and-puff in accordance with an embodiment;

FIG. 10A is a cross-section view of concentric tubing strings provided in the arrangement of FIG. 10 and taken along section line 10A-10A;

FIG. 11 is a schematic illustration of a vertical wellbore with a simultaneous downhole hot fluid injection and oil production arrangement;

FIG. 11A is a cross-section view of concentric tubing strings provided in the arrangement of FIG. 11 and taken along section line 11A-11A;

FIG. 12 is a schematic illustration of a hot fluid injection arrangement configured for a surface heat exchanger; and FIG. 12A is a cross-section view of concentric tubing strings provided in the arrangement of FIG. 12 and taken along section line 12A-12A.

Figure 1:
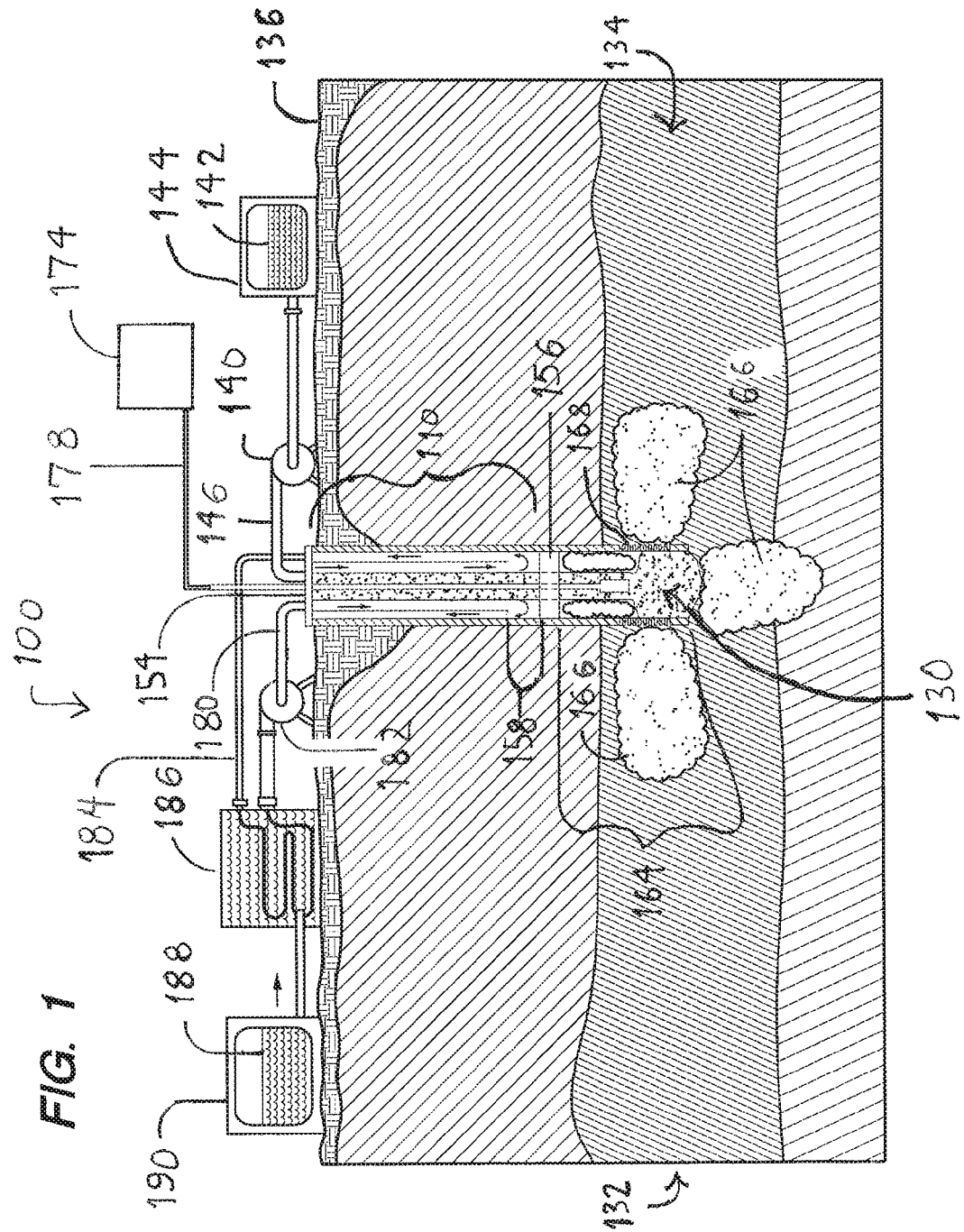
FIG. 1 is a schematic illustration of a vertical wellbore for a cyclic steam stimulation or huff and puff for high-quality downhole steam generation and oil production arrangement in accordance with an embodiment.

While the invention is susceptible to various modifications and alternative forms, specific embodiments thereof are shown by way of example in the drawings and may herein be described in detail. The drawings are not to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Embodiments of the present invention are directed to various methods and systems for recovering petroleum resources using vertical, horizontal and lateral wellbores in geological subterranean formation strata from a vertical position. The geological structures intended to be penetrated in this fashion may be coal seams, uranium, methane hydrate, oil sands, heavy and light hydrocarbons from a subterranean formation bearing strata for increasing the flow rate from a pre-existing wellbore. Other possible uses for the disclosed embodiments can be used for high pressure high-quality downhole steam injection for steam fracking of low permeability subterranean formations such as low gravity heavy oil, diatomite, tight oil, shale oil, shale gas, leaching of uranium ore and sulfur from subterranean formations or for introducing horizontal and vertical channels for steam injection, heated solvents, and chemicals, for example. Those skilled in the art will understand that the various embodiments disclosed herein may have other uses which are contemplated within the scope of the present invention.

Referring to FIG. 1, a cross-sectional view of an embodiment of a cyclic steam stimulation or huff and puff of high-quality downhole steam generation arrangement 100 in accordance with an embodiment of the present invention is illustrated. In accordance with the arrangement 100 of FIG. 1, vertical wellbore 130 heat losses resulting in lower quality steam is reduced through the use of a high-quality downhole steam generation section 110 of a vertical wellbore 130.

Figure 2:
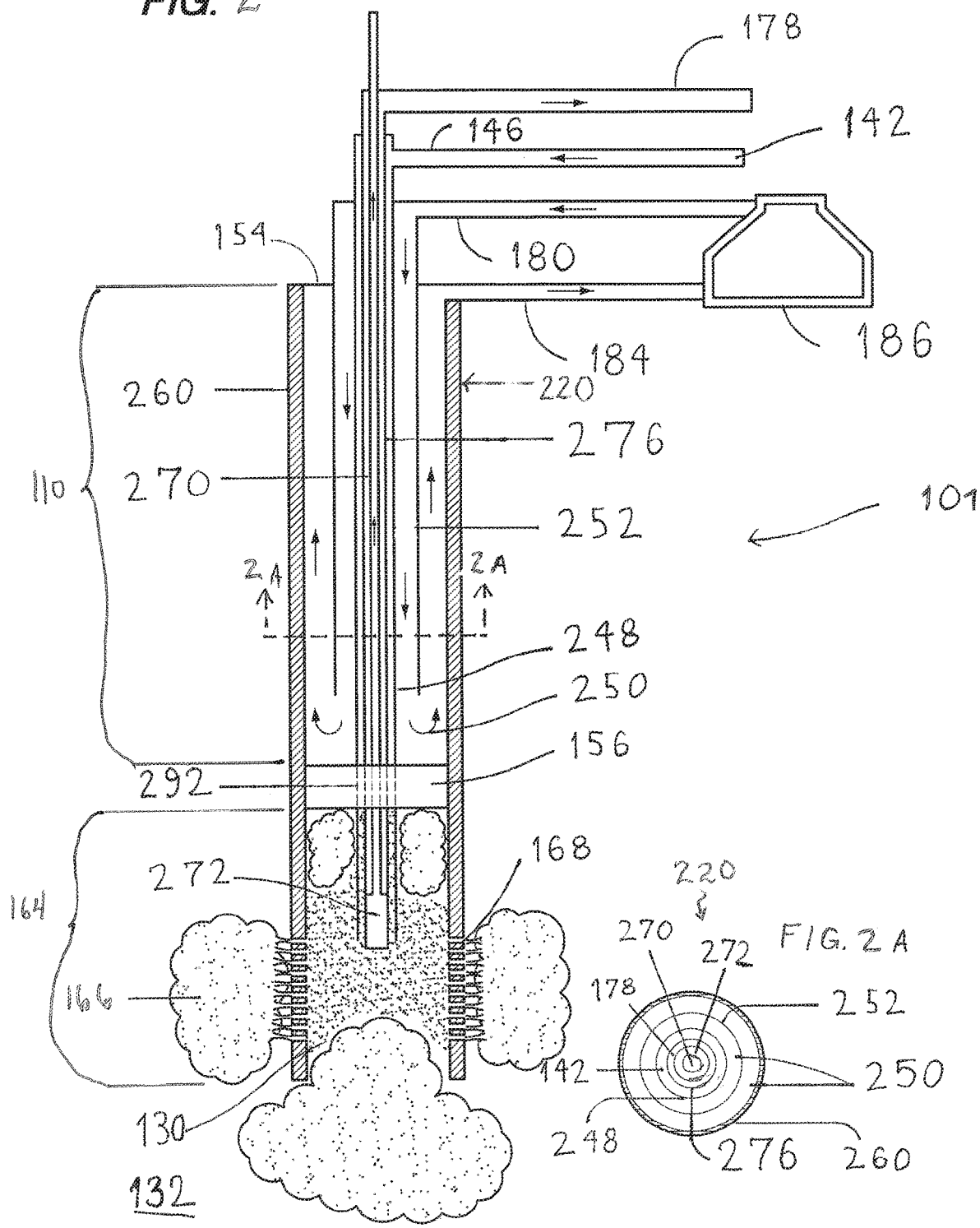
FIG. 2 is a schematic illustration of a vertical wellbore with a simultaneous downhole steam injection and oil production arrangement in accordance with an embodiment.

Referring to FIGS. 2 and 2A, the embodiment of a simultaneous steam injection and oil production arrangement 101 is depicted in which the high-quality downhole steam generation section 110 comprises an arrangement of concentric tubing strings 220 positioned within the vertical wellbore 130 that is formed in a subterranean formation 132 to recover deposits 134 therefrom. In various embodiments, the depth of the high-quality downhole steam generation section 110 will vary according to the depth of the subterranean formation 132. For example, in various embodiments, the depth of the vertical wellbore 130 from a surface 136 above the subterranean formation 132 may be between several hundred feet and 10,000 thousand feet or more. A discussion on how the high-quality downhole steam generation and oil production arrangement 100 depicted by FIG. 1 and the simultaneous steam injection and oil production arrangement 101 depicted by FIG. 2 are configured and operated to recover the deposits 134 from the subterranean formation 132 now follows.

The concentricity of the various tubing strings in the vertical wellbore 130 in the cross-sectional view of FIG. 2A and taken along section line 2A-2A in FIG. 2. In the illustrated embodiments, the surface pump 140 advances a liquid 142 comprising hot feedwater from a surface storage tank 144 through a conduit 146 and down into the vertical wellbore 130 to the area of the subterranean formation 132 via an innermost tubing string 248 of the concentric tubing strings 220. Likewise, with the aid of heat from a recirculating hot heat transfer fluid 250 flowing down into the vertical wellbore 130 via an outermost tubing string of the concentric tubing strings 220, the liquid is converted into a vapor by heat transfer exchange of heat from the recirculating hot heat transfer fluid 250 in the high-quality downhole steam generation section 110 of the vertical wellbore 130. Therefore, no downhole combustion takes place at the site of steam generation in the downhole tubing.

Within the scope of the subject invention, and as appropriate to different subterranean and deposit formations, the liquid 142 may comprise other liquids in addition to or other than water.

By way of example, the substance with which deposits are releasable in a vapor phase may be employed in the form of oil convertible at the subterranean formation to oil vapor. The liquid 142 may, for example, comprise diesel oil or gas oil. Additionally, the liquid 142 injected into the innermost tubing string 248 is provided between the surface pump 140 and innermost tubing string 248. For example, in an embodiment the liquid 142 is a hot feedwater that is injected at a super critical hot water temperature and pressure to maximize the thermal energy prior to conversion to high-quality downhole steam being delivered to the hydrocarbons in the subterranean formation 132.

As depicted, the outermost tubing string 252 surrounds the innermost tubing string 248 from a well head 154, which sealing the vertical wellbore 130 at the surface 136, down to a position adjacent or above of a thermal packer 156. This shorting of the outermost tubing string 252 relative to the innermost tubing string 248 leaves a downhole section 158 of the innermost tubing string 248 that is not surrounded by the outermost tubing string 252 or casing/annulus 260. This downhole section 158 permits a casing/annulus 260 of the concentric tubing strings 220 to act as a recirculation conduit for the return of the cooled hot heat transfer fluid 250 to the surface 136 for reheating after exchanging heat, from the well head 154 to the top of the thermal packer 156, to the liquid 142 flowing downwards in the vertical wellbore 130 via the hot innermost tubing string 248. In an embodiment, the length of the downhole section 158 from the distal end 262 of outermost tubing string 252 to the top (surface) of the thermal packer 156 may range from several hundred feet to 10,000 feet or deeper. In another embodiment, the outermost tubing string 252 may extend to the top of the thermal packer 156 and perforations, slot, etc. (not shown) opening to the casing/annulus 260 may be provided in the outermost tubing string 252 above the thermal packer 156. In either of the above disclosed embodiments, it is to be appreciated that the outermost tubing string 252 is in fluid communication with the casing/annulus 260 such that the hot heat transfer fluid 250 can be continually circulated from the surface 136, down the outermost tubing string 252, up the casing/annulus 260, and back to the surface 136, or vice-versa. In this manner, the hot heat transfer fluid 250 is constantly recycled and recirculated and kept from escaping into the subterranean formation 132, and thereby is economically preserved.

As shown by FIG. 1 and FIG. 2, the thermal packer 156 seals a lower section 164 of the vertical wellbore 130 or the casing/annulus 260 from the high-quality downhole steam generation section 110 and the casing/annulus 260 above the thermal packer 156. The innermost tubing string 248 extends through the thermal packer 156 and opens into the lower section 164. In this manner, the downwardly flowing liquid 142 which has been converted into a vapor from the heat applied against the hot innermost tubing string 248 by the circulating hot heat transfer fluid 250 in the high-quality downhole steam generation section 110, is injected or pressure driven into the subterranean formation 132.

It is to be appreciated that at a certain depth of the vertical wellbore 130 in the high-quality downhole steam generation section 110, the hot heat transfer fluid 250 flowing in the outermost tubing string 252 flashes the liquid 142 flowing in the extremely hot innermost tubing string 248 into high-quality downhole steam 166 which is directed through perforations 168 provided in the casing/annulus 260, and into the subterranean formation 132. As the heat energy of the hot heat transfer fluid 250 is exchanged to the liquid 142 throughout the high-quality downhole steam generation section 110, continued heating of the steam 166 downhole likewise can occur in the high-quality downhole steam generation section 110, which based on controlled operating temperatures, pressures and flow rates of the liquid 142 and hot heat transfer fluid 250 can result in a range of steam quality as well as superheated steam being provided to the subterranean formation 132 as desired. Additionally, controlling the sequence of providing the flow of liquid 142 and the hot heat transfer fluid 250 into the vertical wellbore 130, the subterranean formation 132 may be subjected to hot water injection or hot fluid injection for thermal stimulation and enhanced recovery of the deposit.

As used in this application, the phrase "high-pressure steam" means steam having a pressure ranging from 1,000 to 2,500 psia. As used in this application, the phrase "hot water or hot oil (fluid) injection" means a fluid having a temperature ranging from 100 to 500 degrees F. As used in this application, the phrase "high-quality steam" means a steam quality of 0.80 or more, with steam quality being the proportion of saturated steam (vapor) in a saturated condensate (liquid)/steam (vapor) mixture. For example, a steam quality of 0 indicates 100% liquid (condensate) while a steam quality of 1 indicates 100% steam. One pound (1 lb) of steam with 95% steam and 5% percent of liquid entrainment has a steam quality (also called, steam dryness), of 0.95. The steam quality or dryness fraction is used to quantify the amount of water within steam. Steam dryness has a direct effect on the total amount of transferable energy contained within the steam (usually just latent heat), which affects heating efficiency and quality. Saturated steam (meaning steam that is saturated with heat energy) is completely gaseous and contains no liquid. Conventional surface steam boilers do not generate 100% saturated steam or dry steam. When a steam boiler heats up water, bubbles breaking through the water surface will pull tiny water droplets in with the steam. Unless a super heater is used to super heat the steam, this will cause the steam supply to become partially wet (wet steam) from the added liquid. Superheated steam is a type of steam that is created by adding heat above the saturated steam threshold. The added heat raises the steam's temperature higher than its saturation point, allowing the amount of superheat to be easily determined by simply measuring its temperature.

A major drawback of prior art, conventional surface steam boilers, requires very pure water to have any chance of operating and to reduce the scale on the tubing that affects the heat transfer. Since the cost of pure water in remote areas is very costly those processes are obviously uneconomical in most cases. The embodiments of the present invention have no such requirement and can operate with contaminated water or produced brackish water of high mineral content.

Additionally, even a downhole-recovered condensate of the vapor or super heated steam may be employed.

It is to be appreciated that in the arrangements 100 and 101, the heat transfer from the thermal fluid to the liquid for generating high-quality downhole steam occurs downhole in the vertical wellbore 130 and not on the surface 136. Therefore, scale may occur downhole on the tubing. Mitigation of the reduction and/or removal of scale may be accomplished with the aid of a scale inhibitive solution, which may be pumped downhole from a tank by pumps into the innermost tubing string 248. In the alternative, a common oil field practice is the use of acid to stimulate a subterranean formation. As an alternative to this concept a truck with a tank filled with acid can be employed to do an acid wash of the scale build-up within the innermost tubing string 248 allowing the scale to be washed off the tubing and drop down to the rat hole at the bottom of the vertical wellbore 130. In addition to or in the alternative, high-pressure jetting scale removal may be employed. This will enable the high-quality downhole steam generation tubing, i.e. innermost tubing string 248, to be almost free of scale build-up that will improve the surface area and heat transfer area for conversion of liquid to high-quality downhole steam. Suitable substances for the inhibitive solution include acetic acid, hydrochloric acid, and sulfuric acid in sufficiently low concentration to avoid damage to the system and avoid an environmental issue in the reservoir.

Combining the high-quality downhole steam 166 in such a manner with other methods will also enhance the recovery of the deposits 134 therefrom. For example, some of the other methods may include having the liquid 142 also comprise, in addition to water, heated solvents and/or surfactants as well as supplementing such with heated gas(es). Surfactants are compounds that lower the surface tension of a liquid, the interfacial tension between two liquids, or that between a liquid and a solid. Surfactants may act as wetting agents, emulsifiers, foaming agents, and dispersants. Surfactants are usually organic compounds that are amphiphilic, meaning they contain both hydrophobic groups and hydrophilic groups. Therefore, a surfactant molecule contains both a water insoluble (and oil soluble) component and a water soluble component. Surfactant molecules will diffuse in water and adsorb at interfaces between air and water or at the interface between oil and water, in the case where water is mixed with oil.

Surfactants and solvents combined with downhole steam injection have the potential to significantly increase oil recovery over that of conventional water flooding. The availability of a large number of surfactant structures makes it possible to conduct a systematic study of the relation between surfactant structure and its efficacy for oil recovery. Also, the addition of an alkali such as sodium carbonate makes possible in-situ generation of surfactant and significant reduction of surfactant adsorption. In addition to reduction of interfacial tension to ultra-low values, surfactants and alkali can be designed to alter wettability followed by steam injection to enhance oil recovery.

An alkaline surfactant process is designed to enhance spontaneous imbibition in fractured, oil-wet, carbonate formations. Mobility control is essential for steam-surfactant EOR to improve the sweep efficiency of surfactant and steam injected into fractured reservoirs. The placement of a catalyst downhole can improve cyclic steam, heavy-oil recovery by upgrading the produced oil downhole by increasing the saturate and aromatic components and reducing the resin and asphaltene components. The term "aquathermolysis" describes the chemical interaction of high temperature, high-pressure water with the reactive components of heavy oil and bitumen.

In aquathermolysis, the metal species added to steam interact with organic sulfur compounds. In a huff-and-puff operation the aquathermolysis catalyst will reduce the oil viscosity downhole by more than 60% and substantially increase the oil production for the steam cycle. The metal species in the catalyst for this improvement contained $VO^{2+}$, $Ni^{2+}$, $Fe^{3\pm}$ and other additives. The vanadyl sulfate and nickel sulfate are the catalysts for the aquathermolysis of heavy oils, and ferric sulfate is the catalyst for the water-gas shift reaction. At the end of aquathermolysis, the water-gas shift reaction is a major reaction for forming $CO_2$ and $H_2$. It is determined that the above catalyst can significantly alter the composition of heavy oil and, therefore, the heavy oil is upgraded in the reservoir to a higher API gravity oil or lighter oil by removing the asphaltenes. Activating the silica column, obtaining the saturate and aromatic fractions by elution with hexane. What occurs is an oil composition change. After the catalytic treatment, the oil has more saturate and aromatic components, which are lighter, and less resin and asphaltene components, which are heavier. The results of the above catalyst indicate that during aromatization some cyclic hydrocarbons were converted into aromatics. Some normal and iso-alkyl side chains, which are at the edge of the condensed aromatic core in resin and asphaltene molecules, broke off from the condensed aromatic and then converted into alkyl hydrocarbons. The alkyl chain, which links two condensed aromatics in large molecular structures of resin and asphaltene, may break off, and thus the amount of resin and asphaltene decreased and the amount of aromatics increased. In the process, the heavy oil undergoes aquathermolysis during steam injection, and the catalyst injected with steam can accelerate the reaction, resulting in a reduced viscosity and a changed composition of the produced oil that results in higher API gravity lighter oil. With a catalyst added to the steam, the metallic ions can interact with water. The proton from the complex molecule can attack the sulfur atom, and the hydroxide ion can attack the carbon atom. This result in the electronic cloud excursion and leads to a further decrease in bond energy. Because of this, the C—S bond will break in the process of aquathermolysis and result in a low amount of sulfur and heavy components such as resin and asphaltene.

In the aquathermolysis process, $H_2S$ will be produced because of the desulfurization of heavy oil. Recently it has been suggested that gaseous $H_2S$ may promote the water-gas shift reaction through the intermediate formation of carbonyl sulfide (COS). At the same time, $H_2S$ will react with the metal ions and produce metal sulfides. It is well known that metal sulfides are useful catalysts for hydrode-sulfuriztion of heavy oil. The analysis found that all transition metal species have the ability to accelerate the decomposition of the sulfur compounds regardless of whether the sulfur was in an aromatics or an aliphatic environment. Among all the transition metal species, $VO^{2+}$ and $Ni^{2+}$ are the most effective for aquathermolysis of heavy oil.

Oil reservoirs are large porous medium that contain sands, clay minerals, and non-clay minerals. The clay mineral surface has a negative charge. When the catalyst solution is injected into the oil reservoir, the metal ions, such as $VO^{2+}$ and $Ni^{2+}$, can be adsorbed on the surface of clay minerals via the electrostatic force. Under this circumstance, the minerals support the catalyst in a similar manner as in a typical refinery process.

At the same time, the steam injected into the oil reservoir reacts with most of the rock minerals and clay minerals.

Clay minerals are silica-aluminate compounds that under high temperature can react with steam and swell up in the formation preventing a successful steam distribution.

As mentioned above, the high-pressure, high-quality downhole steam 166 produced from the liquid 142 is driven or injected into the subterranean formation 132 releasing e.g., hydrocarbons from the deposits 134 therein. The high-quality downhole steam 166 adds thermal energy to the deposits 134 and, in the example of hydrocarbons, serves to reduce the viscosity of the hydrocarbons from the subterranean formation deposit. Reducing the viscosity of the hydrocarbons causes the hydrocarbons from the subterranean formation 132 to flow into the vertical wellbore 130, into another adjacent vertical wellbore (if provided) or downwards deeper into the subterranean formation 132 to another adjacent horizontal wellbore(s) or lateral wellbore(s) (if provided), due to gravity drainage.

In the illustrated embodiments of FIG. 1 and FIG. 2, the hydrocarbons from the subterranean formation 132 which flow into the vertical wellbore 130 are captured and pumped to the surface 136 through a sucker rod and pump 270 and/or an electrical submersible pump (ESP) 272 through an oil production outlet conduit 178 to one or more tanks 174 on the surface 136. In this regard, the electrical submersible pump (ESP) 272 and/or the sucker rod and pump 270 are provided at a point sufficiently deep within the vertical wellbore 130 to pump the flowing hydrocarbons to the surface. The electrical submersible pump (ESP) 272 and all electrical cabling necessary for operation and control of the electrical submersible pump (ESP) 272 are provided within an innermost tubing string 276 which can also include the sucker rod and pump 270. In the illustrated embodiment of FIG. 2, the innermost tubing string 276 is concentric with the other tubing strings 248, 252, 260 of the concentric tubing strings 220 in the arrangement 101. In other embodiments discussed hereafter in later sections, the sucker rod and pump 270 and/or electrical submersible pump (ESP) 272 or progressive cavity pump (PCP) may be positioned differently.

It is to be appreciated that a cyclic action referred to as cyclic steam stimulation or "huff and puff" can be provided using the arrangement 100 of FIG. 1 and/or FIG. 10. Referring to FIGS. 2 and 11 (discussed further hereafter in a later section), unlike conventional cyclic steam stimulation arrangements, due to the sucker rod and pump 270 and/or the electrical submersible pump (ESP) 272 being provided within the innermost tubing string 276 in the arrangements 101 and 1100, separate steam lines/tubing arrangements do not have to be removed from the vertical wellbore 130 before or after a steam cycle in order to install the sucker rod and pump 270 and/or the electrical submersible pump (ESP) 272 along with a separate oil production outlet conduit 178 in order to recover the hydrocarbons from the vertical wellbore 130. In other words, the generation and providing of the high-quality downhole steam 166 in the vertical wellbore 130 as well as the capturing and pumping of the hydrocarbons to the surface 136 from the vertical wellbore 130 may take place simultaneously. Additionally, some other noted advantages of the simultaneous high-quality downhole steam injection and oil production arrangement 101 (FIG. 2) and a hot fluid injection and oil production arrangement 1100 (FIG. 11) are the cost savings of a production rig, labor to pull and insert the sucker rod and pump before and after each steam cycle or hot fluid injection, which could be 2 to 4 times per year per well, and downtime of the oil operation. Thus, periodic short cycle steam injection or hot fluid injection will maintain consistent higher oil production.

Furthermore, it is to be appreciated that water may be recovered from the subterranean formation 132 after condensation of the high-quality downhole steam 166 and may then be re-circulated to the surface 136 through the innermost tubing string 276, via the sucker rod and pump 270 and/or the electrical submersible pump (ESP) 272, where it can be treated at the surface 136 for reuse, which has tremendous economical benefits such as savings in water cost and eliminate the costly off-site disposal of the produced water as well as the unknown timing and approval of permitting and the drilling cost of an on-site waste water injection well. In other words, any liquid substance may be recovered from the subterranean formation 132 after condensation of its vapor to a liquid. In practice, such recovery of the liquid substance may take place in the course of removal of the released deposits from the subterranean formation.

Such fluid recovery is also beneficial especially when using the liquid 142 as a heated feedwater which is injected down the innermost tubing string 248 at a temperature of about 250° F., which due to the pressure and the lack of an exchange of heat from the hot heat transfer fluid 250 being operated in such a fashion (low temperature, restricted or no flow, etc.), does not convert into a vapor phase, thereby allowing very hot water or hot oil injection into the vertical wellbore 130 for any designated time period desired. A hot water or hot oil (fluid) injection has shown to successfully reduce the viscosity of the heavy viscous oil. A viscosity curve shows that when a heavy oil formation is heated to about 160° F. viscosity reduction down to about 500 centipoise is achieved to sufficiently liquefy the deposits 134, such as heavy oil, to flow through the subterranean formation 132 to the vertical wellbore 130 or to another nearby production well.

In the various embodiments disclosed herein, the vertical wellbore 130 and the various tubing strings may be formed of insulated/uninsulated concentric coiled tubing string, insulated/uninsulated threaded tubing string such as Macaroni threaded tubing, Vacuum Insulated Tubing or Thermocase® insulated threaded tubing, which is commercially available from Vallourec Tube-Alloy, or wireline tool. Coiled tubing string is well known to those skilled in the art and refers generally to metal piping that is spooled on a large reel. Macaroni threading tubing is well known to those skilled in the art. Thermocase® insulated threaded tubing is well known to those skilled in the art. Coiled tubing, Thermocase® tubing and Macaroni threaded tubing may have a diameter of about 1 inch to about 5 inches. For example, with reference made to FIG. 2A showing in cross-section the concentric tubing strings 220, the innermost tubing string 276 may have a diameter of between 1 inch to 2 inches in one embodiment, and in another embodiment has a 1⅞ inch diameter. The innermost tubing string 248 may have a diameter of between 1½ inch to 2⅞ inches in one embodiment, and in another embodiment has a 1⅝ inch diameter. The outermost tubing string 252 may have a diameter of between 2 inches to 6 inches in one embodiment, and in another embodiment has a 5 inch diameter. The casing/annulus 260 may have a diameter of between 5 inches to 9⅞ inches in one embodiment, and in another embodiment has a 7 inch diameter. Of course, those skilled in the art will understand that the various embodiments are not limited to coiled tubing and threaded tubing, or to any particular dimensions of the tubing.

In some embodiments, an expandable tubular may be used in the vertical wellbore 130 as part of the concentric tubing strings 220. Expandable tubulars are described in, for example, U.S. Pat. No. 5,366,012 to Lohbeck and U.S. Pat. No. 6,354,373 to Vercaemer et al., each of which is incorporated by reference as if fully set forth herein.

The downhole heating configuration disclosed herein generates convective, conductive and/or radiant energy that heats both the feedwater/steam generation string, i.e., (steam generation) innermost tubing string 248 and the casing/annulus 260. Accordingly, a layer of insulation (not shown) may be provided between the hot heat transfer fluid inlet tubing string or outermost tubing string 252 and the return cooled heat transfer fluid outlet of the casing/annulus 260. A granular solid fill material may also be placed between the casing/annulus 260 and the subterranean formation 132. The casing/annulus 260 may conductively heat the fill material, such as a gas, which in turn conductively heats the subterranean formation 132. The casing/annulus 260 may include vacuum insulated tubing. A gas drive with the desired pressure could be employed to effectively push the heat from the casing/annulus 260 away from the vertical wellbore 130 and into the subterranean formation 132.

Referring again to FIG. 1 and FIG. 2, the hot heat transfer fluid 250 is delivered from the surface 136 to the outermost tubing string 252 through a hot heat transfer fluid inlet conduit 180. The hot heat transfer fluid 250 is pumped and circulated downhole through the hot heat transfer fluid inlet conduit 180 via a pump 182. After exiting through the distal end 262 of the outermost tubing string 252, the cooled heat transfer fluid 250 ascends/is drawn or circulated back to the surface 136 in the conduit spacing provided between tubing strings 252, 260 or the casing/annulus to a hot heat transfer fluid outlet conduit 184. The suction side of pump 182 draws on the hot heat transfer fluid 250 heated in a surface thermal fluid heater 186, which causes the returning cooled heat transfer fluid to be drawn into the heater 186 via outlet conduit 184. Also, the built up wellbore pressure will bring the returning cooled heat transfer fluid to the surface. The returning cooled heat transfer fluid is then reheated by the thermal fluid heater 186, e.g. from the combustion of fuel 188 from a fuel tank 190, and delivered under pump pressure to the heat transfer fluid inlet conduit 180 as the hot heat transfer fluid 250. Accordingly, together with outermost tubing string 252, casing/annulus 260, the fluid inlet conduit 180, fluid outlet conduit 184, the pump 182, and thermal fluid heater 186 form a closed-loop heat transfer fluid system which provides a continuously circulating hot heat transfer fluid in operation.

Although the pump 182 is depicted positioned on the hot side of the thermal fluid heater 186, in other embodiments it may be positioned on the cool side thereof. Additionally, a reserve storage flask on the surface containing additional heat transfer fluid 250 may be included in the closed loop to ensure sufficient heat transfer fluid in the high-quality downhole steam generation section 110. It is to be appreciated that according to factors such as pump capability, thermal fluid heater capability, distance between surface 136 and the bottom of the vertical wellbore 130, and the type of heat transfer fluid 250, for example, the tube sizing for the outermost tubing string 252, casing/annulus 260, the fluid inlet conduit 180, fluid outlet conduit 184, as well as flow rate of the hot heat transfer fluid 250 within the closed-loop system may vary as is needed to produce a desired steam quality within the high-quality downhole steam generation section 110 that is delivered to the lower section 164 of the vertical wellbore 130. Likewise, similar factors are applicable to the flow rate of the liquid 142 into the innermost tubing string 248 provided by surface pump 140 as well as tube sizing of the innermost tubing string 248. Determining such factors and choosing such equipment as pumps, thermal fluid heater, tubing types and sizes, location and type of feedback/control sensors, composition of the heat transfer fluid 250 and the liquid 142, to address such factors as well as determining the needed operating parameters, such as temperatures, pressures, and flow rates in the arrangement 100, for example, to provide a desired steam quality downhole is well within the skill set of a person skilled in the related art. It is also to be appreciated that well operators can control various steam injection parameters, such as: steam injection rate, injection pressure, injection temperature, and injection volume. For example, in any one of the herein disclosed embodiments, the steam injection rate, injection pressure steam injection temperature, and the injection volume might be controlled at the surface.

The thermal packer 156 may be provided with a feed valve(s) 292 which controls the rate of the steam that is provided into the lower section 164 of the vertical wellbore 130. In one embodiment, the feed valve(s) 192 responds to the pressure differences between the steam generated in the high-quality downhole steam generation section 110 and the vapor pressure within the lower section 164 of the vertical wellbore 130 so that vapor quality is maintained at a high value.

The thermal fluid heater 186 is configured to operate on any of a variety of energy sources. For example, in one embodiment, the thermal fluid heater 186 operates using combustion of a fuel that may include natural gas, propane, methanol, and biofuel. The thermal fluid heater 186 can also operate on electricity and solar energy.

The heat transfer fluid 250 is heated by the thermal fluid heater 186 to a very high temperature. In this regard, the heat transfer fluid 250 should have a very high boiling point. In one embodiment, the heat transfer fluid is molten sodium with a high boiling temperature of approximately 1,150° F. Thus, the thermal fluid heater 186 heats the heat transfer fluid to a temperature as high as 1,150° F. In still other embodiments, the heat transfer fluid 250 may be diesel oil, gas oil, and synthetic heat transfer fluids, e.g., Therminol™ heat transfer fluid which is commercially available from Solutia, Inc., Marlotherm™ heat transfer fluid which is commercially available from Condea Vista Co., Syltherm™, Duratherm™, Paratherm™ and Dowtherm™ heat transfer fluid which is commercially available from The Dow Chemical Company or any synthetic non corrosive heat transfer fluid, for example. Accordingly, in these other embodiments, the heat transfer fluid 250 which may be a synthetic, is heated to a temperature as high as of 950° F. or another lower temperature. In still other embodiments, the heat transfer fluid 250 is heated to a temperature that is greater than 400° F. to compensate for the thermodynamics of the conversion from liquid 142 to the high-quality downhole steam 166.

In certain embodiments, a surfactant may be used to improve the effectiveness of the heat transfer fluid. Surfactants are compounds that lower the surface tension between a liquid and, for example, a solid (such as the tubing string walls). In this regard, a surfactant-based drag-reducing additive is injected in the concentric tubing string of the hot heat transfer fluid 250. The surfactant effectively reduces the pressure drop in the hot heat transfer fluid 250 and increases the flow rate of the hot heat transfer fluid 250.

Figures 3, 3A:
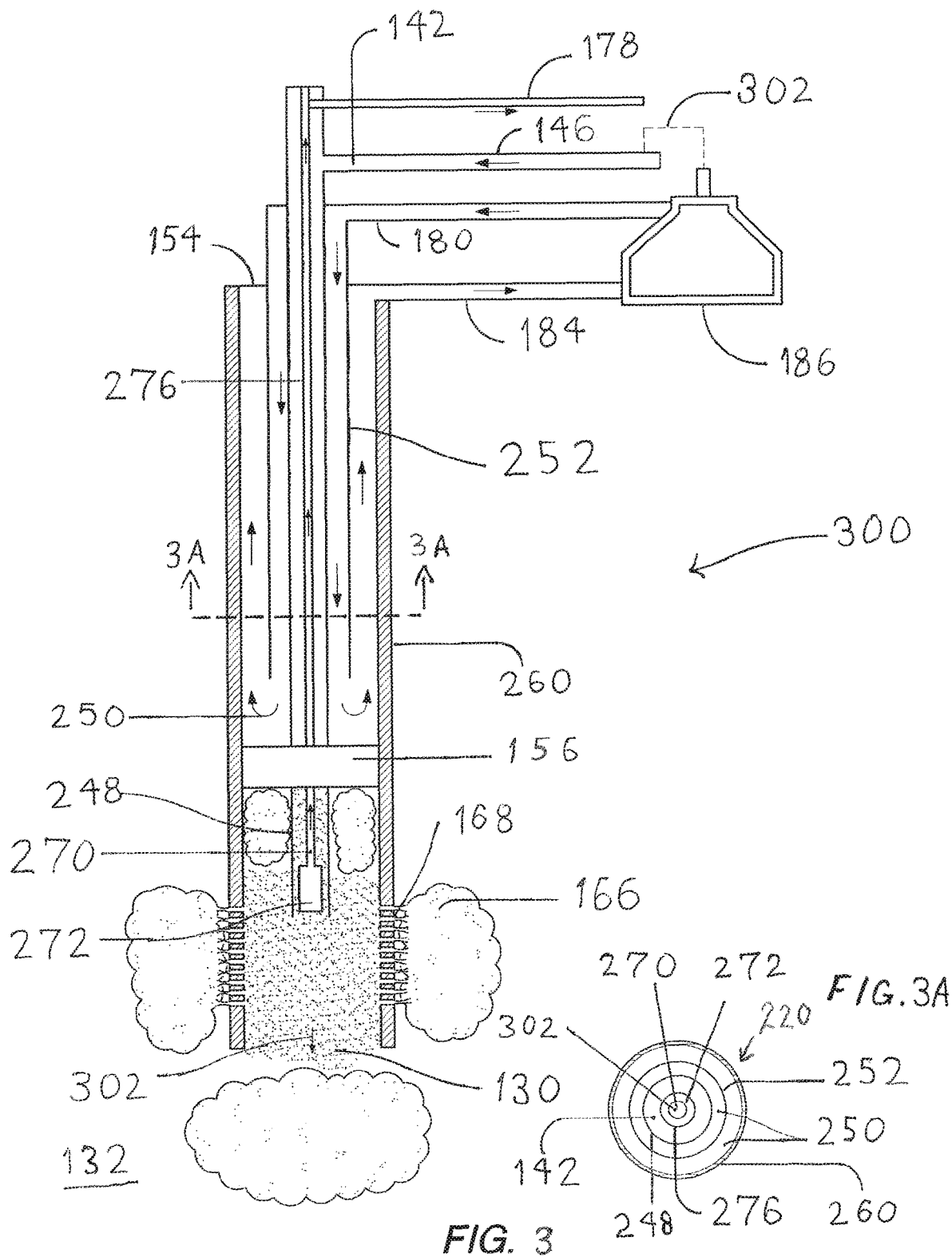
FIG. 3 is a schematic illustration of a vertical wellbore with a high-quality downhole steam generation and oil production arrangement including CO2 and NOx emissions injection in a subterranean formation for sequestration of the emissions in accordance with another embodiment.
FIG. 3A is a cross-section view of concentric tubing strings provided in the arrangement of FIG. 2 and taken along section line 3A-3A.

Referring now to FIG. 3, a cross-sectional view of a second embodiment of a high-quality downhole steam generation and oil production arrangement 300 in accordance with the present invention is illustrated. As the oil production arrangement 300 of FIG. 3 is similar to the embodiment illustrated in FIG. 1, only the differences are discussed hereafter.

FIG. 3 illustrates an embodiment in which emissions 302 from the thermal fluid heater 186 are introduced in the liquid 142. The emissions 302 are then provided downhole through a conduit 146, past the thermal packer 156, down into the vertical wellbore 130, and to the area of the subterranean formation 132 to provide the oil production arrangement 300 with zero emissions 302 at the surface of environmental unfriendly compounds, such as carbon dioxide and nitric oxide that result from the combustion of fuel 188 to heat the fluid 250. In this embodiment, the liquid 142 carries the emissions 302 within the innermost tubing string 248, below the thermal packer 156 into the vertical wellbore 130 where such emissions 302 are released into either a non-oil bearing subterranean formation 132 where the emissions are sequestered, or deposits 134 which may be affected by the emissions that helps reduce the viscosity of the oil. In the latter embodiment, for example, the addition of emissions may effectively improve the properties of the deposits 134 such as reducing the viscosity of heavy oil contained therein.

The concentricity of the various tubing strings in the vertical wellbore 130 in this oil production arrangement 300 is illustrated in the cross-sectional view of FIG. 3A and taken along section line 3A-3A in FIG. 3. As in the previous arrangement 100, the hot heat transfer fluid 250 is carried downward through the outermost tubing string 252, and the cooled transfer fluid is returned upward in the conduit spacing provided between the casing/annulus 260 and the outermost tubing string 252 to the thermal fluid heater 186 for reheating and recirculation. A layer of insulation (not shown) may be provided between the outermost tubing string 252 and the casing/annulus 260 to prevent heat transfer from the hot heat transfer fluid 250 to the cooled transfer fluid being returned to the surface for reheating. Liquid 142 is carried downward through the innermost tubing string 248 which is converted into high-quality downhole steam 166 via an exchange of heat from the hot heat transfer fluid 250 flowing in the outermost tubing string 252 in a similar manner as previously discussed above in reference to the arrangement depicted by FIG. 1. Likewise, as in the embodiment of FIG. 1, the recovered hydrocarbons in the oil production arrangement 300 are delivered to the surface via a sucker rod and pump 270 and/or an electrical submersible pump (ESP) 272 extending within the vertical wellbore 130.

Referring now to FIG. 4, a cross-sectional view of a third embodiment of a high-quality downhole steam generation and oil production arrangement 400 in accordance with the present invention is illustrated for non-thermally completed wells. As the oil production arrangement 400 of FIG. 4 is similar to the embodiment illustrated in FIG. 1, only the differences are discussed hereafter.

FIG. 4 illustrates an embodiment in which high-quality downhole steam generation section 110 is defined between the wellhead 154 and a plate 410 welded to the casing/annulus 260. In other words, the casing/annulus 260 is internally sectioned by the plate 410 such that the high-quality downhole steam generation section 110 is defined above the plate 410, and the lower section 164 is defined as being below the plate 410, wherein the thermal packer 156 is provided in the lower section 164. In this manner, the thermal packer 156 can be provided as frangible thermal cups, such as disclosed by U.S. Pat. No. 4,385,664, the disclosure of which incorporated fully herein by reference. The advantage of such an oil production arrangement 400 is that thermal packer 156 can move with the expansion of the tubing as well as placed at a desired location in the vertical wellbore 130 to reduce the size of the lower section 164, and to reduce heat loss from the lower section 164, as well as the heat damage to a non-thermally completed casing/annulus 260 with non-thermal cement.

As shown by FIG. 4, a collar 420 is welded in the plate 410 to provide a through bore such that the sucker rod and pump 270 and/or an electrical submersible pump (ESP) 272 can be extended below the thermal packer 156 within the vertical wellbore 130. Threads or a shoe 430 are provided at the top of the collar for threading to/seating the innermost tubing string 248. A tail pipe 440, to which the thermal packer 156 surrounds below the plate 410, likewise is connected to the collar 420 such that it is in fluid communications with the innermost tubing string 248. As the tail pipe 440 extends below the thermal packer 156, steam generated in the high-quality downhole steam generation section 110 flows from the innermost tubing string 248 and into the vertical wellbore 130 below the thermal packer 156. As the casing/annulus 260 is internally sealed by the plate 410 and the innermost tubing string 248 when connected to the collar 420, the hot heat transfer fluid 250 will continually circulated through the outermost tubing string 252, and casing/annulus 260 above the plate 410 to convert the liquid 142 which flows in the innermost tubing string 248 into high-quality downhole steam 166 as discussed above in reference to FIG. 1. In such a three string embodiment, it is to be appreciated that due to the spacing provided between the innermost tubing string 248 and the outermost tubing string 252, the volume of the hot heat transfer fluid 250 needed to be circulated in the oil production arrangement (system) 400 can be less than the volume that would be needed in embodiments that use the casing/annulus 260 to define part of the return conduit for the hot heat transfer fluid 250. In still other embodiments, plate 410 may be optional in which the outermost tubing string 252 extends to and is sealed at the bottom by the thermal packer 156 in a similar manner as provided by plate 410 in the previously described embodiment.

The concentricity of the various tubing strings in the vertical wellbore 130 in this oil production arrangement 400 is illustrated in the cross-sectional view of FIG. 4A and taken along section line 4A-4A in FIG. 4. Insulation 450 is provided adjacent the casing/annulus 260, which in this illustrated embodiment is a non-thermally completed casing/annulus 260 with non-thermal cement. In this manner, the cooled transfer fluid 250 returns upward in the conduit spacing provided between the insulation 450 and the outermost tubing string 252 to the thermal fluid heater 186 for reheating and recirculation.

Turning now to FIG. 5, a cross-sectional view of a fourth embodiment of a high-quality downhole steam generation and oil production arrangement 500 in accordance with the present invention is illustrated, which is referred to steam drive or steam flooding. As the oil production arrangement 500 of FIG. 5 is similar to the embodiment illustrated in FIG. 1, only the differences are discussed hereafter.

As noted above, in the embodiment of FIG. 1, the recovered hydrocarbons are delivered to the surface via a sucker rod and pump 270 or an electrical submersible pump (ESP) 272 extending within the vertical wellbore 130. In contrast, in the embodiment of FIG. 5, a recovery arrangement includes a separate vertical oil production wellbore 510 and a horizontal oil collection wellbore 520. In this regard, high-quality downhole steam 166 generated in the high-quality downhole steam generation section 110 adds thermal energy to hydrocarbons from the subterranean formation 132 in the lower section 164 of the vertical wellbore 130 and serves to reduce the viscosity of the hydrocarbons from the subterranean formation deposits 134, causing the hydrocarbons from the subterranean formation 132 to flow downward due to gravity drainage. The downward flowing hydrocarbons (e.g., via gravity drainage) are collected in the horizontal oil collection wellbore 520. The hydrocarbons are brought to the surface through the vertical section of a horizontal oil collection wellbore 520, and are transported to one or more tanks 174 (not shown) on the surface. In this regard, the sucker rod and pump 270 and/or the electrical submersible pump (ESP) 272 are provided near the bottom of the vertical oil production wellbore 510.

It is to be appreciated that in such an embodiment, the innermost tubing string 276 is optional, and has been left out in the illustrated embodiment, and as also depicted by FIG. 5A taken along section line 5A-5A in FIG. 5. In one embodiment, the electrical submersible pump (ESP) 272 and all electrical cabling necessary for operation and control of the pump (ESP) 272 are provided within the vertical oil production wellbore 510. In the illustrated embodiment of FIG. 5, the vertical oil production wellbore 510 is separate from the vertical wellbore 130. In other embodiments, the vertical section of a horizontal oil collection wellbore 520 may be formed as a part of the vertical wellbore 130. Of course, those skilled in the art will recognize that there may be one or more horizontal oil collection wellbores 520 and one or more vertical oil production wellbores 510 for each vertical wellbore 130. Similarly, there may be a plurality of one or more vertical wellbores 130 for each horizontal oil collection wellbore 520 and/or each vertical section of a horizontal oil collection wellbore 520 for improved high-quality downhole steam distribution. Moreover, as is depicted by FIGS. 6 and 6A, the vertical wellbore 130 likewise may connect to one or more horizontal and/or lateral wellbores 630 in which high-quality downhole steam 166 is injected through the perforations 168 directly into such horizontal wellbores 630 for more efficient transfer of heat to the deposits 134. Accordingly, the high-quality downhole steam generation and injection arrangements described in the above embodiments are suitable for use in steam-assisted gravity drainage (SAGD) recovery of hydrocarbons from a subterranean formation as is also depicted by FIG. 6.

Furthermore, as is depicted in FIGS. 7 and 7A, innermost tubing string 248 in the vertical wellbore 130 may also connect to one or more horizontal wellbores 630 by a perforated pipe or slotted liner 710 to release the high-quality downhole steam 166 which is directed through liner perforations 720, and directly into the subterranean formation 132 around the horizontal wellbores 630. The introduction of the perforated pipe or slotted liner 710 into the horizontal wellbores 630 provides for more efficient transfer of heat to the deposits 134, reducing the heat losses through undirected heat transfer. This embodiment may lack perforations 168 in the casing/annulus 260, as they may not be needed if the heat is directed into the horizontal wellbores 630 through the perforated pipe or slotted liner 710. Additionally, as is depicted in FIGS. 8 and 8A, the high-quality downhole steam 166 may be sent through innermost tubing string 248 from the vertical wellbore 130 and into the steam chambers 810 within one or more horizontal wellbores 630 where the high-quality downhole steam 166 is released through chamber perforations 820 and directly into the subterranean formation 132. The introduction of the steam chambers 810 into the horizontal wellbores 630 provides for a more consistent injection of the high-quality downhole steam 166 throughout the subterranean formation 132. This creates a more uniform temperature profile across the subterranean formation 132, avoiding hot spots and cold spots that may otherwise occur. As depicted by FIG. 8A taken along section line 8A-8A in FIG. 8, the steam chambers 810 are located concentrically within the innermost tubing string 248. The high-quality downhole steam generation and injection arrangements described in the above embodiments are suitable for use in steam-assisted gravity drainage (SAGD) recovery of hydrocarbons from a subterranean formation as is also depicted by FIG. 7 and FIG. 8.

Figures 9, 9A:
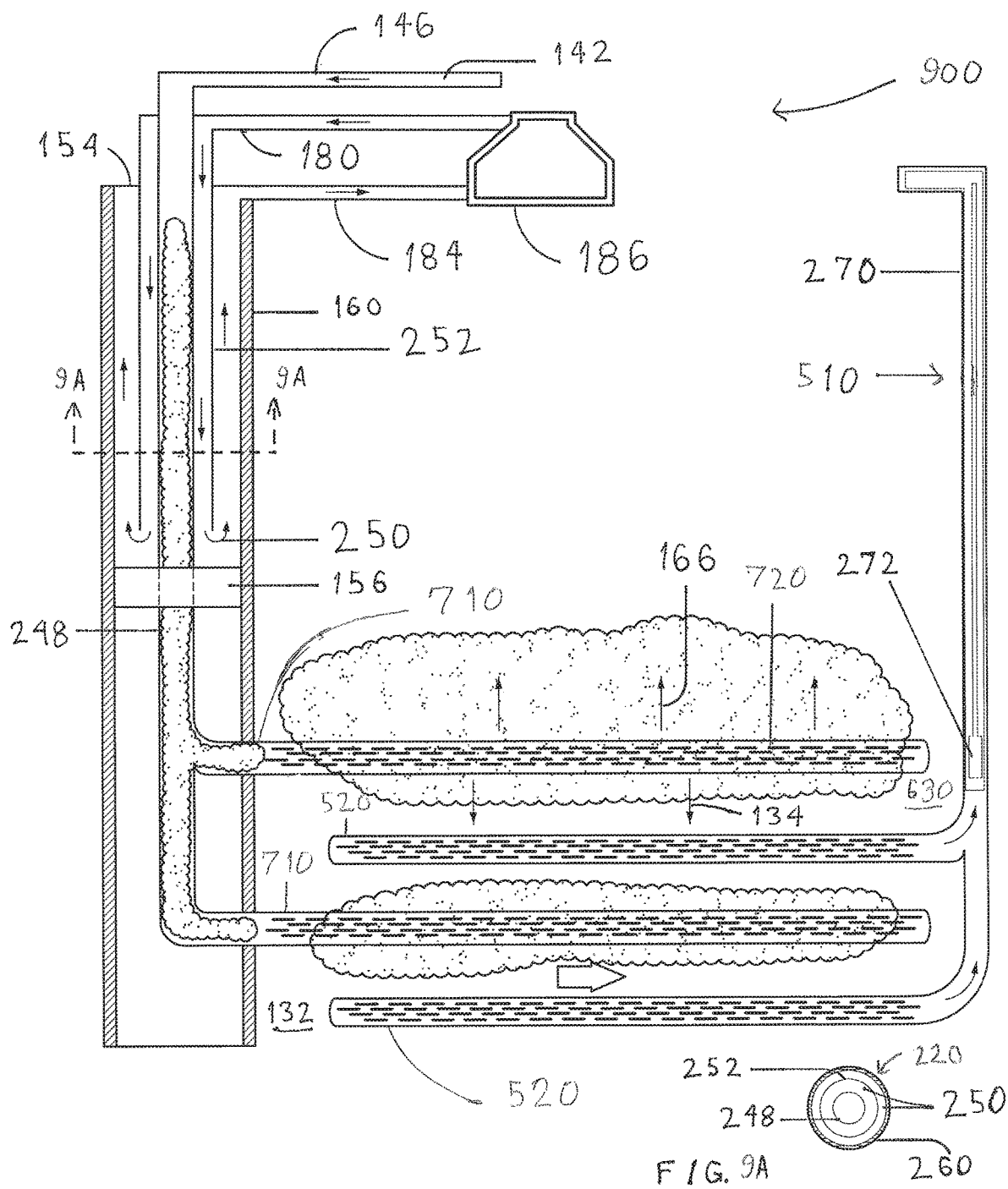
FIG. 9 is a schematic illustration of the embodiment of FIG. 5 configured for steam assisted gravity drainage (SAGD) with several multilateral wellbores for high-quality downhole steam generation and oil production arrangement.
FIG. 9A is a cross-section view of concentric tubing strings provided in the arrangement of FIG. 9 and taken along section line 9A-9A.

Moreover, as is depicted by FIGS. 9 and 9A, in arrangement 900 the vertical wellbore 130 likewise may connect to two or more horizontal wellbores 630 in which high-quality downhole steam 166 is injected through the perforations 168 through perforated pipe or slotted liner 710 and directly into such horizontal wellbores 630 for more efficient transfer of heat to the deposits 134. Also as depicted in FIGS. 9 and 9A, the vertical oil production wellbore 510 may connect to two or more horizontal oil collection wellbores 520. This or similar embodiments may also include the use of steam chambers 810 and chamber perforations 820 in the horizontal wellbores 630. Accordingly, the high-quality downhole steam generation and injection arrangements described in the above embodiments are suitable for use in steam-assisted gravity drainage (SAGD) recovery of hydrocarbons from a subterranean formation as is also depicted by FIG. 6.

In another embodiment, the one or more horizontal oil collection wellbore 520 connected to the vertical oil production wellbore 510 may include a flow control system to control unwanted fluids or steam as well as return the wells back to desired performance levels. Such a flow control system can be installed in the horizontal oil collection wellbore 520 either before or after the well's completion. The flow control system can be used to prevent or remedy negative effects caused by reservoir heterogeneities, breakthrough of undesired fluids, heel-to-toe effect, hot spots, and steam production. The installation of a flow control system post-completion can remove the need to recomplete the well or drill a new well. The flow control system is comprised of a series of flow control devices and high-temperature packers inside the existing completion within tubing to equalize the inflow of hydrocarbons. The high-temperature packers compartmentalize flow in certain areas of the well, helping channel production through the flow control devices. One suitable example of such a flow control device that can be used in such a flow control system is the EQUALIZER retrofit (RF) flow control device from Baker Hughes (Houston, Tex.). The flow control system can be installed as part of a pre-existing perforated liner or screen completion, and improving hydrocarbon recovery overall. Upon breakthrough of an undesired fluid such as water or steam, the pressure drop across the device increases, causing the undesired fluid to be choked back to avoid the breakthrough in the horizontal oil collection wellbore 520. The pressure drop then decreases for desired fluids and hydrocarbons. Likewise, different flow resistant rating settings can be selected for each flow control device, enabling customized flow control options for each horizontal oil collection wellbore 520.

Turning now to FIG. 10, a cross-sectional view of a fifth embodiment of a high-quality downhole steam generation arrangement 1000 in accordance with the present invention is illustrated, which is referred to as cyclic steam stimulation or huff-and-puff. As the arrangement 1000 of FIG. 10 is similar to the embodiment illustrated in FIG. 1, only the differences are discussed hereafter.

Unlike the embodiment depicted by FIG. 2, the sucker rod and pump 270 and/or the electrical submersible pump (ESP) 272 are not provided within an innermost tubing string 276 in the arrangement 1000, as is best depicted by FIG. 10A. As such, separate steam lines/tubing arrangements have to be removed from the vertical wellbore 130 before or after a steam cycle in order to install the sucker rod and pump 270 and/or the electrical submersible pump (ESP) 272 along with a separate oil production outlet conduit 178 in order to recover the hydrocarbons from the vertical wellbore 130. In other words, the generation and providing of the high-quality downhole steam 166 in the vertical wellbore 130 as well as the capturing and pumping of the hydrocarbons to the surface 136 from the vertical wellbore 130 do not take place simultaneously. During the oil production phase, the hot heat transfer fluid 250 continually circulates, allowing the oil production tubing to remain hot. This enables the viscous very heavy oil deposits 134, usually less than 10 API gravity, to be easily pumped up without the need for chemical treatment to lower the viscosity. Accordingly, some of the noted advantages of the simultaneous high-quality downhole steam generation and oil production arrangement shown by FIG. 2 may not be seen by the arrangement 1000 depicted by FIG. 10 as such an arrangement 1000 may have some of the costs associated with a production rig, and the labor to pull and insert the sucker rod and pump 270 and/or the electrical submersible pump (ESP) 272 before and after each steam cycle, which could be 2 to 4 times per year per well, as well as the downtime of the oil operation. Nonetheless, all of the other remaining noted advantages disclosed herein would still result from the arrangement 1000 depicted by FIG. 10.

The concentricity of the various tubing strings in the vertical wellbore 130 in this arrangement 1000 is illustrated in the cross-sectional view of FIG. 10A and taken along section line 10A-10A in FIG. 10. In the illustrated embodiment, the sucker rod and pump 270 and/or the electrical submersible pump (ESP) 272 are shown along with the steam lines/tubing arrangements wherein a recirculating hot heat transfer fluid 250 flows down into the vertical wellbore 130 via an outermost tubing string 252. Additionally, the liquid 142 injected into the innermost tubing string 248 heated by a thermal fluid heater 186 is depicted in the illustration. The sucker rod and pump 270 and/or the electrical submersible pump (ESP) 272 are not provided within an innermost tubing string 276 in the arrangement 1000, as an oil production outlet conduit 178 must be installed with the sucker rod and pump 270 and/or the electrical submersible pump (ESP) 272 in order to recover the hydrocarbons from the vertical wellbore 130.

Referring now to FIG. 11, a cross-sectional view of an embodiment of a simultaneous downhole hot fluid injection and oil production arrangement 1100 in accordance with the present invention is illustrated. As the arrangement 1100 of FIG. 11 is similar to the embodiment illustrated in FIG. 2, only the differences are discussed hereafter.

FIG. 11 illustrates an embodiment in which the subterranean formation 132 is heated with hot feedwater 1110 converted from the liquid 142, to flood the subterranean formation 132. The liquid 142 is injected down the innermost tubing string 248 where the hot heat transfer fluid 250 exchanges its heat energy to the liquid 142, raising the temperature to about 250° F., or in some embodiments between about 400-1150° F. converting it to hot feedwater 1110. Due to a low pressure and decreased exchange of heat from the hot heat transfer fluid 250 because of low temperature, restricted of no flow, etc., the liquid 142 does not convert into vapor phase as would happen in certain other embodiments, thereby allowing very hot fluid (e.g., water or oil) injection into the vertical wellbore 130. The hot feedwater 1110 extends below a thermal packer 156 positioned in the vertical wellbore 130, and directed through perforations 168 provided in the casing/annulus 260 to achieve a hot water injection (flood) in the subterranean formation. The hot fluid injection of the subterranean formation 132 creates thermal stimulation and enhanced recovery. A hot fluid injection has also shown to successfully reduce the viscosity of the heavy viscous oil to a degree that the deposits 134 liquefy sufficiently to flow through the subterranean formation 132 to the vertical wellbore 130 or to another nearby production well.

The concentricity of the various tubing strings in the vertical wellbore 130 in this arrangement 1100 is illustrated in the cross-sectional view of FIG. 11A and taken along section line 11A-11A in FIG. 11. As in the previous arrangement 100, the hot heat transfer fluid 250 is carried downward through the outermost tubing string 252, and the cooled transfer fluid is returned upward in the conduit spacing provided between the casing/annulus 260 and the outermost tubing string 252 to the thermal fluid heater 186 for reheating and recirculation. A layer of insulation 450 (not shown) may be provided between the outermost tubing string 252, and casing/annulus 260 to prevent heat transfer from the hot heat transfer fluid 250 to the cooled transfer fluid being returned to the surface for reheating. Here, liquid 142 is carried downward through the innermost tubing string 248 and converted to hot feedwater 1110, via an exchange of heat from the hot heat transfer fluid 250 flowing in the outermost tubing string 252 in a similar manner as previously discussed above in reference to the arrangement depicted by FIG. 2, without the conversion to high-quality downhole steam 166. Likewise, as in the embodiment of FIG. 2, the recovered hydrocarbons in the oil production arrangement 300 are delivered to the surface via a sucker rod and pump 270 and/or an electrical submersible pump (ESP) 272 extending within the vertical wellbore 130. Moreover, as is depicted by FIGS. 12 and 12A which illustrate a hot fluid injection arrangement 1200, the thermal fluid heater 186, heat transfer fluid inlet conduit 180, and hot heat transfer fluid outlet conduit 184 may be replaced by connecting a surface heat exchanger 1210 directly to conduit 146, providing the hot feedwater 1110 directly into the vertical wellbore 130. This embodiment eliminates the need for the outermost tubing string 252 and the hot heat transfer fluid 250 to exchange heat to the liquid 142, simplifying the process and the number of parts needed.

A detailed description of one or more embodiments of the disclosed apparatus and method are presented herein by way of exemplification and not limitation with reference to the Figures.

Methane hydrate is a clathrate compound in which water molecules freeze about methane molecules to form "cages" that trap the methane molecules therein. Methane hydrate deposits are believed to represent significant potential energy reserves for the energy industry but are difficult to recover. Due to the specific pressure and temperature requirements for the formation of methane hydrate, these deposits are primarily formed underground in subsea and arctic locations, frustrating their recovery.

A completion system for multilateral wellbores is envisioned. The lateral wellbores include a first lateral wellbore and a second lateral wellbore. The lateral wellbores might be deviated and are provided by entirely separate lateral wellbores. It is noted, however, that there can be a single parent lateral wellbore for the two proximately spaced laterals with equal effect. These Figures are not provided in the patent application.

The laterals are formed at least partially in, through, or otherwise proximate to a subsurface volume, which at least partially comprises methane hydrate. It is to be appreciated that the volume can include any number of other substances, e.g., sand, sediment, other gases, liquids, solids, etc. The volume might be located at a subsea or arctic location, or any other location satisfying the unique temperature and pressure requirements that support the initial formation of methane hydrate as a deposit.

The first lateral wellbore is arranged to convey high-quality downhole steam into contact with the volume. The term "high-quality steam" means a temperature greater than that of the methane hydrate, carrying energy that can be used to heat the volume. For example, flashing hot treated feedwater on the heat exchanger or high-quality downhole steam generation tube in the lateral wellbore produces high-quality downhole steam. A thermal fluid heater at the surface heats a heat transfer fluid that descends downhole in a concentric tubing string. The hot heat transfer fluid exchanges the feedwater to a vapor or high-quality downhole steam emanating from the lateral wellbores perforations permitting the high-quality downhole steam to be pumped into contact with the volume.

The application of high-quality downhole steam to the volume will cause ice in the volume to melt, thereby enabling methane to be liberated from the cage of previously frozen water molecules. By "liberated", it is meant that the methane is released from the methane hydrate in the volume, that is no longer trapped, contained, or restricted by the frozen water molecules of the methane hydrate, or otherwise is able to move in order for the methane to be produced. The second lateral wellbore is accordingly arranged to receive the methane that is liberated from the methane hydrate in the volume. The second lateral wellbore can be provided with ports, perforations, or other openings with or without screens in order to permit entry of the methane into the second lateral wellbore for production of the methane. In addition, in some embodiments, the second lateral wellbore will also include one or more ESPs to assist in pumping the liberated fluid up-hole. The circulating hot heat transfer fluid in the concentric tubing string in the lateral wellbore will provide sufficient amount of heat that will help reduce the chances of a hydrate plug forming up-hole of the formation.

In view of the above, it is to be appreciated that the functions of supplying heat from the hot heat transfer fluid and producing the methane are divided between the strings, with each of the strings handling solely a designated task. In this way, the system can be arranged to more efficiently control the parameters relevant to the formation of methane hydrate, e.g., temperature and pressure.

Utilizing two separate lateral wellbores in the system enables the first lateral wellbore to be located deeper than and/or or below the second lateral wellbore with respect to gravity. This arrangement promotes the efficient production of methane in a variety of ways. For example, while the high-quality downhole steam will generally disperse in all directions and form a pocket or envelop around the lateral wellbore, the positioning of the first lateral wellbore deeper than the second lateral wellbore will enable the natural tendency of high-quality downhole steam to rise, i.e., travel opposite to the direction of gravity to primarily direct the high-quality downhole steam from the lateral wellbore into the volume. It will be understood that the second lateral wellbore could be otherwise located providing that the envelope of the high-quality downhole steam and hence liberated methane will have access to the lateral wellbore to promote production. The relatively low-density methane will tend to "rise above" water and other heavier molecules, causing the methane to move opposite to the direction of gravity and into the lateral wellbore. It is also noted that sand, sediment, and other solid particles initially trapped in or with the volume or surrounding ice will tend to move in the direction of gravity and settle about the lateral wellbore hence being left behind instead of blocking the progress of the methane into the lateral wellbore.

The lateral wellbore is arranged with an instrumentation line. The instrumentation line is included to assist in controlling operation of the system and can include fiber optic lines, hydraulic control lines, or power and/or data communication lines. The lines can include sensors therewith or be otherwise configured to sense or monitor one or more parameters, such as temperature and pressure, if fiber optic is used. In this way, the amount of high-quality downhole steam conveyed via the lateral wellbore can be tailored in response to changing downhole conditions. Also important is the condition within the lateral wellbore that can be controlled in order to prevent methane hydrate from reforming and/or water molecules refreezing therein. For example, the hot heat transfer fluid provided in the concentric tubing string will keep the volume and surrounding system components from freezing, but the methane and other fluids produced by the tubing string may cool significantly while traveling through the lateral wellbore to prevent the formation of methane hydrate or ice plugs within the lateral wellbore.

It is to be appreciated that the laterals represent one example of suitable lateral wellbore structures in which to install the first and second lateral wellbores. For example, the lateral wellbore structures for containing the first and second lateral wellbores are formed as one or two separate lateral wellbores.

The system as described enables the method of producing methane from methane hydrate enabling conveying high-quality downhole steam to a formation containing methane hydrate through a first lateral wellbore located deeper than a second lateral wellbore section relative to gravity; liberating methane from the methane hydrate; and receiving the methane in the second lateral wellbore section. But further, the system lends itself to controlling any one or more parameters of methane hydrate stability, any one of which being capable of causing a destabilizing effect that results in the liberation of methane from the hydrate form.

In another embodiment, the high-quality downhole steam generation and injection arrangements described in the above embodiments may be used for the purpose of downhole steam generation to remediate groundwater contamination. In situ thermal remediation is the injection of energy into the subsurface to mobilize and recover volatile and semi-volatile organic contaminants. Steam-enhanced extraction is now commonly used to remediate contaminants from source zones. This and other embodiments of the present invention can be applied to a wide variety of contaminant types and in a wide variety of hydro-geologic conditions. When applied aggressively, the downhole steam generator is capable of reducing residual contamination to very low levels; the contamination is then degraded by natural attenuation processes. The downhole steam generator can provide the heat to the subsurface that affects the physical properties of organic liquids in porous media that has a direct impact on reducing the levels of residual contamination that will remain after thermal treatment. The use of this technology has obvious benefits for the environments, as well as being more effective than other processes and methods.

In some embodiments where a recirculating hot heat transfer fluid 250 transfers thermal energy a liquid 142, the hot heat transfer fluid 250 used may be thermal oil. Traditionally, steam has been used for this process due to its availability, low cost of water, and few environmental issues. Thermal oils are heat transfer fluids that transfer the heat from one hot source to another process. This could be from a combustion chamber or from any exothermic process. The main application is in fluid phase heat transfer. Thermal oils are available in chemically different forms, but not limited to; synthetic oil, which are aromatic compounds, petroleum based oils, which are paraffin's, and synthetic glycol based fluids. Thermal oils are available in a wide range of specifications to suit the needs of various processes.

Currently available thermal oils have a maximum temperature limit of about 400° C. Effective heat transfer by steam uses latent heat, where the saturation pressure dictates the temperature at which heat transfer takes place. To achieve 350° C. of the steam, a pressure of 180 bar is required. To obtain a higher temperature, the pressure must be increased. This in turn requires higher thickness for the heat exchanger tubes, increasing the weight and thermal stresses, and requiring special manufacturing techniques. In contrast, even at 350° C., the pressure requirements of thermal oils are just sufficient to overcome the system pressure drops, also decreasing the pumping costs. The system to support the use of thermal oil is also simple, requiring only a pump, expansion and storage tank, and the heat exchangers. A conventional surface steam boiler requires demineralized makeup water supply, drains, traps, safety valves, chemical additions, and blow downs. Using thermal oil over steam also eliminates corrosion, scaling, fouling, tubing failure in the steam vessel and deposits in the heat transfer areas. Some examples of thermal oils that may be suitable for various methods and systems for recovering petroleum resources include, but are not limited to, Therminol from Solutia Inc., Dowtherm from Dow Chemical Co., Exceltherm from Radco Industries Inc. and Paratherm from Paratherm Corp. While the maximum temperature at which the thermal oil is thermally stable is the most important characteristic, other characteristics to consider when determining which type or brand to use are the heat transfer co-efficient, pumpability, serviceability, environmental issues such as toxicity, shipping restrictions and disposal methods, and oxidation and degradation potential.

In some examples, the high-quality downhole steam generation and injection arrangements described in the above embodiments may be used in conjunction with fracking methods of oil production. For example, high-quality downhole steam generation may be used to allow injection of high-pressure, high-quality downhole steam to facilitate fracking of subterranean formations. The injection of high-pressure, high-quality downhole steam may result in the propagation of fractures in the formation or the rock layer. Steam fracking is a technique used to fracture the rock layer directly adjacent to the oil and gas well to substantially enhance hydrocarbon recovery. Steam fracking eliminates potential environmental impacts, including contamination of ground water, risks to air quality, the migration of gases and hydraulic fracturing chemicals to the ground water, the surface, surface contamination from spills and the health effects of these. Steam fracking points to the vast amount of low-volume produced viscous heavy oil, low-permeability diatomite, shale oil, tight oil, shale gas and coal bed methane. Steam fracking is environmentally safe and will satisfy the environmentalists and does not jeopardize the health of inhabitants.

The foregoing description of embodiments has been presented for purposes of illustration and description. The foregoing description is not intended to be exhaustive or to limit embodiments of the present invention to the precise form disclosed, and modifications and variations are possible in light of the above teachings or may be acquired from practice of various embodiments. The embodiments discussed herein were chosen and described in order to explain the principles and the nature of various embodiments and its practical application to enable one skilled in the art to utilize the present invention in various embodiments and with various modifications as are suited to the particular use contemplated. As such, in further embodiments, features from specific embodiments may be combined with features from other embodiments. For example, features from one embodiment may be combined with features from any of the other embodiments. For example, the three string embodiment depicted by FIG. 4 may be suitable employed in any of the embodiments which use the casing/annulus 260 to define part of the return conduit for the hot heat transfer fluid 250 to reduce the number of gallons of the hot heat transfer fluid needing to be circulated by the system.

The invention claimed is:

1. A system for producing hydrocarbons from a subterranean formation via a wellbore with a casing extending from a surface to the subterranean formation, said system comprising:
   a thermal packer for positioning in the wellbore;
   concentric tubing strings for positioning within the casing of the wellbore, said concentric tubing strings comprise an innermost tubing string that is inside and concentric to an outermost tubing string in which a majority of the innermost tubing string is surrounded by the outermost tubing string expect for a downhole section of the innermost tubing string adjacently above the thermal packer that is not surrounded by the outermost tubing string,
   wherein the downhole section permits a spacing formed between the casing and outermost tubing string upon the positioning of the concentric tubing strings within the casing to act as a recirculation conduit for returning a heat transfer fluid that in turn flows downwards in the wellbore via a conduit formed by a spacing between the innermost tubing string and the outermost tubing string, and
   wherein of the concentric tubing strings only the innermost tubing string extends below the thermal packer such that a liquid or hot feedwater, which descends in the innermost tubing string, converts downhole to high-quality steam inside the innermost tubing string via a heat transfer from the heat transfer fluid which circulates only above the thermal packer and which high-quality steam is injected into the wellbore below the thermal packer to heat and reduce viscosity of the subterranean formation via the downhole converted and injected high-quality steam to temperatures that allow for viscous hydrocarbon production from the subterranean formation.

2. The system of claim 1, further comprising a pump which circulates the heat transfer fluid.

3. The system of claim 1, further comprising a liquid supply which supplies the liquid or hot feedwater.

4. The system of claim 1, further comprising a thermal fluid heater which heats the heat transfer fluid.

5. The system of claim 1, further comprising at least one of an electrical submersible pump or a sucker rod and pump which recovers liquefied hydrocarbons.

6. The system of claim 5, wherein the at least one of an electrical submersible pump or a sucker rod and pump is provided in the innermost tubing string.

7. The system of claim 1, further comprising a perforated pipe or slotted liner connected to the innermost tubing string.

8. The system of claim 1, further comprising a production line.

9. The system of claim 1, further comprising a series of flow control devices.

10. The system of claim 1, wherein the heat transfer fluid comprises one or more of the following: thermal oil, diesel oil, gas oil, molten sodium, and a synthetic non-toxic heat transfer fluid.

11. The system of claim 4, wherein the thermal fluid heater is configured to introduce emissions therefrom into the liquid or hot feedwater for injecting into the subterranean formation.

12. The system of claim 1, further comprising a plate with a collar provided therein to section the casing.

13. The system of claim 1, further comprising insulation provided adjacent the outermost tubing string.

14. A method of heating a subterranean formation from a surface comprising utilizing the system of claim 1 within the casing of the wellbore.

* * * * *